(12) United States Patent
Shimizu

(10) Patent No.: US 7,423,678 B2
(45) Date of Patent: Sep. 9, 2008

(54) AREA IMAGE SENSOR

(75) Inventor: Makoto Shimizu, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 410 days.

(21) Appl. No.: 10/533,925

(22) PCT Filed: Nov. 6, 2003

(86) PCT No.: PCT/JP03/14165

§ 371 (c)(1), (2), (4) Date: May 4, 2005

(87) PCT Pub. No.: WO2004/043061

PCT Pub. Date: May 21, 2004

(65) Prior Publication Data

US 2006/0164529 A1 Jul. 27, 2006

(30) Foreign Application Priority Data

Nov. 7, 2002 (JP) ............................. 2002-323695
Nov. 7, 2002 (JP) ............................. 2002-323767

(51) Int. Cl.
*H04N 5/335* (2006.01)
(52) U.S. Cl. ............................................ 348/294
(58) Field of Classification Search .............. 348/245, 348/241, 243, 246, 247, 249, 382
See application file for complete search history.

(56) References Cited

U.S. PATENT DOCUMENTS

| 5,872,596 | A | 2/1999 | Yanai et al. |
| 6,970,193 | B1 * | 11/2005 | Kidono et al. .............. 348/245 |
| 7,106,371 | B1 * | 9/2006 | Kubo et al. .................. 348/246 |
| 7,280,142 | B2 * | 10/2007 | Toyoda et al. ............... 348/246 |

(Continued)

FOREIGN PATENT DOCUMENTS

EP 1 067 777 1/2001

(Continued)

*Primary Examiner*—Lin Ye
*Assistant Examiner*—Amy Hsu
(74) *Attorney, Agent, or Firm*—Hamre, Schumann, Mueller & Larson, P.C.

(57) ABSTRACT

The present invention provides a CMOS area image sensor that makes it possible to prevent or reduce at least image quality degradation based on an inappropriate brightness distribution that is produced in the pickup image and image degradation based on image distortion that is produced in the pickup image to obtain a high-quality pickup image. A plurality of pixels arranged in a lattice shape on the imaging face of the CMOS area image sensor are constituted by a photodiode 10, a select transistor TRs for outputting accumulated electrical charge resulting from exposure from the photodiode 10, an electrical charge holding circuit comprising a capacitor C for temporarily holding the accumulated electrical charge from the photodiode 10 and a transfer transistor TRt for controlling the transfer of the accumulated electrical charge to the capacitor C; and a reset transistor TRr for discharging the residual electrical charge of the capacitor C. The level of an inappropriate photoelectric conversion signal of each pixel arising from a non-uniform transmissive light amount distribution to the imaging face of the imaging optical system as a result of the photoelectric conversion signal that is outputted by each pixel being multiplied by a vertical correction coefficient that is preset for each row and a horizontal correction coefficient that is preset for each column is corrected.

22 Claims, 17 Drawing Sheets

U.S. PATENT DOCUMENTS

| | | |
|---|---|---|
| 2002/0008760 A1 | 1/2002 | Nakamura |
| 2003/0156204 A1 | 8/2003 | Sato et al. |

FOREIGN PATENT DOCUMENTS

| | | |
|---|---|---|
| JP | 54-80024 | 6/1979 |
| JP | 2-60380 | 2/1990 |
| JP | 4-281681 | 10/1992 |
| JP | 5-48460 | 2/1993 |
| JP | 6-98080 | 4/1994 |
| JP | 06098080 A * | 4/1994 |
| JP | 6-152586 | 5/1994 |
| JP | 6-205307 | 7/1994 |
| JP | 8-205034 | 8/1996 |
| JP | 9-130603 | 5/1997 |
| JP | 9-247536 | 9/1997 |
| JP | 2000-69371 | 5/2000 |
| JP | 2001-16509 | 1/2001 |
| JP | 2001-36816 | 2/2001 |
| JP | 2001-275029 | 10/2001 |
| JP | 2001-346102 | 12/2001 |
| JP | 2002-237998 | 8/2002 |

* cited by examiner

FIG.1
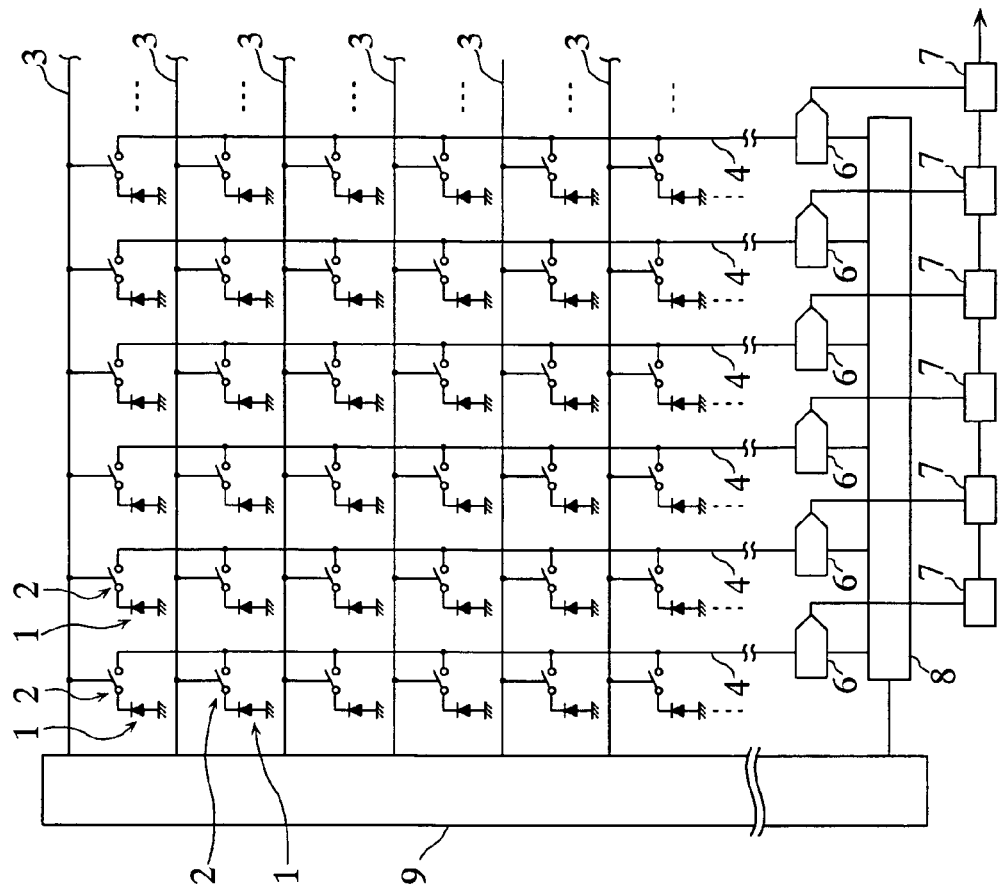
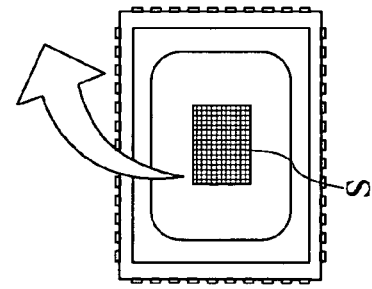

AREA IMAGE SENSOR

TECHNICAL FIELD

The present invention relates to a CMOS (Complementary Metal Oxide Semiconductor)-type area image sensor that is integrated into a digital camera or the like, for example and relates, more particularly, to a technology for improving the quality of an image that is imaged by the area image sensor.

BACKGROUND ART

The area image sensor has photoelectric conversion elements consisting of a plurality of photodiodes and so forth (referred to as 'pixels' hereinbelow) arranged in the form of a lattice, converts a subject optical image that is imaged on the pixel placement face (imaging face) by means of an imaging lens to an electrical signal (voltage signal) with a size corresponding to the amount of light received from each pixel, and outputs electrical signals from each pixel in a predetermined order. The electrical signals (signals corresponding to the density of the image) from each pixel are stored in memory so as to be arranged in the light-receiving position of each pixel on the basis of the outputted order after being converted to a digital signal, whereby an electrical signal corresponding to the subject optical image is obtained.

FIG. 23 is a constitution of one pixel of the conventional CMOS area image sensor shown in JP-A 2001-036816, for example. One pixel is constituted by a photodiode PD that performs conversion to an electrical charge amount according to the received light amount and accumulates the electrical charge; a reset transistor M1 consisting of a FET (Field Effect Transistor) for discharging electrical charge remaining in the photodiode PD before starting exposure; a switching transistor M3 consisting of an FET for controlling the timing for reading to a signal line L for the charge that has accumulated in the photodiode PD (exposure end timing), an amplification transistor M2 consisting of a FET for amplifying a voltage signal (voltage signal of the cathode of the photodiode PD) based on the electrical charge when the electrical charge that has accumulated in the photodiode PD after the end of exposure is outputted to the outside by the signal line L.

The cathode of the photodiode PD is grounded and the anode is connected to the source of the reset transistor M1 and the gate of the amplification transistor M2. Further, the drain of the reset transistor M1 and the drain of the amplification transistor M2 are connected to a VDD power supply. The source of the amplification transistor M2 is connected to the drain of the switching transistor M3 and the source of the switching transistor M3 is connected to the signal line L. Further, the gate of the reset transistor M1 is connected to a reset line R and the gate of the switching transistor M3 is connected to an address line A.

Signal lines L for outputting an electrical signal (known as a 'light reception signal' hereinbelow) from a plurality of pixels that are arranged in columns on the right side of each column, for example, with a plurality of pixels arranged in a lattice shape are arranged and address lines A for inputting a signal (read signal) for controlling the read timing for reading a reception signal to a plurality of pixels arranged in the row below each column, for example, and reset lines R for inputting a signal (reset signal) for controlling the discharge timing of the remaining electrical charge are arranged. A plurality of A/D converters 101 are provided in correspondence with each signal line L below the imaging face and the lower end of each signal line L is connected to the corresponding A/D converter 101. The source of the switching transistor M3 of the plurality of pixels arranged in each column is connected to the corresponding signal line L.

Further, one end of each address line A and each reset line R is connected to a control portion 100 that controls the output of the read signal and reset signal. The gates of the switching transistors M3 of the plurality of pixels arranged in each row are connected to the corresponding address lines A and the gates of the reset transistor M1 of the plurality of pixels arranged in each row are connected to the corresponding reset lines R.

The imaging operation by the CMOS area image sensor is performed as follows.

Suppose that the row numbers from the pixel column of the highest row of the imaging face to the pixel column of the lowest row are 1, 2, ... n, and the address numbers of the address lines corresponding to each row are 1, 2, ... n, a vertical synchronization signal is used as a synchronization signal for controlling an exposure operation from the first row to the nth row, that is, an exposure operation equivalent to one screen and a horizontal synchronization signal is used as a synchronization signal for controlling the exposure operation for each row. When a vertical synchronization signal is inputted, a read signal and reset signal are outputted in sync with the horizontal synchronization signal to each row in order from the first row by means of the control portion 100. The plurality of pixels arranged in each row are reset (discharge of remaining electrical charge) by means of a reset signal after the light reception signal has been read to the A/D converter 101 via the signal line L by means of the read signal and the exposure is started, wherein the exposure operation is performed until the next read signal and reset signal are inputted.

Therefore, with this CMOS area image sensor, the exposure operation of the plurality of pixels arranged in each row is started by providing a time difference corresponding to a cycle Th of the horizontal synchronization signal and, when time that corresponds to a cycle Tv of the vertical synchronization signal has elapsed, the exposure operation is ended, whereupon the reception signal is read from each pixel, A/D converted by the A/D converter 101, and then outputted to an external frame memory via a shift register. Further, the time difference between the start of exposure of the uppermost row and the start of exposure of the lowermost row is a time corresponding substantially to the cycle Tv of the vertical synchronization signal and, therefore, the light reception signals of all the pixels that constitute an image of one frame are obtained after the time 2Tv corresponding to two cycles' worth of the vertical synchronization signal has elapsed after the start of exposure.

Further, the conventional CMOS area image sensor is the main cause of degradation of the pickup image (original image) on account of the structure of this sensor and processing to compensate for the image degradation is required in a circuit downstream of the CMOS area image sensor.

For example, because the area image sensor has a flat imaging face with a horizontal rectangular shape, when the light of the average light amount is irradiated on the imaging face by means of an imaging lens as will be described subsequently, there is the problem that the light amount does not enter the whole of the imaging face uniformly and the periphery of the pickup image is then darker than the center thereof, that is, the brightness distribution of the original image differs from the subject optical image.

FIG. 24 is a schematic diagram showing an imaging optical system of a digital camera in which an area image sensor IS is provided. According to FIG. 24, when light reaching the area image sensor IS via the center of the lens Z is examined, while the incident light A enters the center So of the image read area S of the area image sensor IS via the center of the lens Z, light B that enters at an angle θ with respect to the incident light A enters the peripheral part Sr of the image read area S. The light path length from the center of the lens Z to the image read area S grows longer as light reaches the periphery of the image read area and, therefore, supposing that the light amount at the center So of the image read area S is 1, the light amount at the peripheral part Sr of the image read area S is theoretically determined by $\cos^4 \theta$. Thus, in the area image sensor IS with a flat imaging face, the light amount at the peripheral part of the image read area S is small in comparison with the light amount at the center So of the image read area S. This tendency is more pronounced the more compact the imaging device is rendered by making the distance to the image sensor from the lens short.

Further, FIG. 25 shows the distribution of light amounts in the image read area S. As shown in the same figure, in the image read area S, the light amount is maximum at the center corresponding with the optical center of the lens and grows smaller toward the peripheral part. More specifically, the light amount gradually decreases in moving further away from the center point O and, in a remote area at substantially the same distance from the center point O, the light amount is substantially the same. The light amount distribution in an X cross-section of the image read area S is expressed by a secondary curved line in which the center point O has the maximum light amount, and, at a point $P_1$ on the X axis a distance Lx from the center point O, a light amount at which the maximum light amount is x %, for example, is produced, as shown in FIG. 25B. Further, the light amount distribution of the Y-axis cross-section is also, as shown in FIG. 25C, expressed by a secondary curved line for which the center point O has the maximum light amount and, at a point $P_2$ on the Y axis a distance Ly from the center point O, a light amount at which the maximum light amount is y %, for example, is produced. If the image is outputted by reflecting the light amount distribution of such an area image sensor as is, the image grow dark toward the periphery.

Therefore, in the case of a conventional area image sensor, a variety of techniques enabling a substantially uniform brightness to be obtained over the whole area of the output image by correcting such a light amount distribution have been proposed. For example, it has been proposed that a DSP (digital signal processor) for correcting a digital signal be incorporated in the area image sensor and that correction be performed as a result of the DSP multiplying the output value of each light-receiving element by the reciprocal number value of the ratio with respect to the maximum light amount of the light amount at the points where the light-receiving elements are positioned.

For example, the light amount at point $P_1$ shown in FIG. 25 has a maximum light amount of x % and, therefore, the reciprocal number value at point $P_1$ is (100/x). Therefore, when the output values of the pixels arranged on points $P_1$ of the image read region S are multiplied by the reciprocal number value, corrected values that are substantially the same as the maximum light amount are obtained, as shown in FIG. 26. As a result, by performing correction by multiplying the output value of each pixel by the reciprocal number value corresponding with each pixel, a substantially uniform brightness is obtained over the whole of the output image.

However, this method of multiplying reciprocal number values by using the DSP necessitates the allocation of the reciprocal number values to all the pixels and, therefore, there is the drawback that a memory comprising a correction table in which a multiplicity of reciprocal number values are stored must be provided, and so forth. Moreover, in this case, the greater the number of pixels, the larger the number of reciprocal number values and a large memory capacity is therefore required, which leads to an increase in costs.

In order to limit the memory capacity, as shown in FIG. 27, creating a correction table that corresponds only to the pixels in one quadrant of the image read area S and using this correction table by expanding same to the other quadrants may also be considered. With this method, although the memory capacity can be reduced to substantially ¼, it is hard to say that there will be an adequate cost reduction.

Further, as a method that makes it possible to obtain a uniform light amount over the whole area of the image read area S without correcting the output from the pixels, combining a so-called ND (neutral density) filter with reduced light transmission toward the center of the image read area S with an area image sensor has been proposed. That is, if this ND filter is disposed in the vicinity of the front face of the area image sensor, the light amount at the center of the image read area S can be compulsorily reduced by the ND filter and, therefore, the whole of the image read area S can be afforded a uniform light amount.

However, in this case, by integrating the light amount of the internal region of the image read area S with the light amount of the peripheral region by cutting the incident light, there is the inconvenience of reducing the output of the whole of the area image sensor.

Further, as mentioned earlier, a conventional CMOS area image sensor generates image data equivalent to one frame by performing the exposure operation for a time corresponding to the cycle Tv of the vertical synchronization signal for each row in order by providing a time difference corresponding to a cycle Th of the horizontal synchronization signal from the uppermost row to the lowermost row and, therefore, when the subject optical image moves to the right within the imaging face in accordance with the movement of the photographic subject, for example, there is a shift between the position of the photographic subject at the exposure timing at the top within the imaging face and the position of the photographic subject at the exposure timing at the bottom, whereby the pickup image is an image in which the photographic subject drifts to the right side as one approaches the lower side of the screen. The drift state of the photographic subject grows larger with increased speed of movement of the photographic subject and, in cases where the photographic subject moves at high speed, this constitutes a moving image and image distortion is generated.

In order to resolve this problem, making the shift in the exposure start timing of each row by shortening the cycle Th of the horizontal synchronization signal, for example, as small as possible may also be considered. However, when the frequency of the horizontal synchronization signal is increased, another problem arises that the electrical power consumed by the area image sensor increases as a result of the increase in the electrical power consumed by the A/D converter 101 and so forth.

As detailed earlier, a conventional CMOS area image sensor has factors that cause image degradation in the original image in that the pickup image grows darker toward the periphery even when the pickup image is small on account of the structure of the CMOS area image sensor and image distortion is readily produced in the pickup image with respect to a moving body.

DISCLOSURE OF THE INVENTION

The present invention was conceived to resolve the above problem and provides an area image sensor that makes it possible to prevent or reduce at least image quality degradation based on an inappropriate brightness distribution that is produced in the pickup image and image degradation based on image distortion that is produced in the pickup image to obtain a high-quality pickup image.

The area image sensor provided by the present invention is an area image sensor comprising a plurality of pixels arranged in a lattice shape on an imaging face for photoelectrically converting light of a subject optical image that is focused on the imaging face via an imaging optical system into an electrical signal in each pixel and outputting the electrical signal, each pixel comprising: a photoelectric conversion element that converts light rendered through exposure by accumulating electrical charge in accordance with a received light amount into an electrical signal; a select transistor for outputting to the outside accumulated electrical charge from the photoelectric conversion element following the end of exposure; one or two or more electrical charge holding circuits provided between the photoelectric conversion element and the select transistor that comprise a capacitor for temporarily holding electrical charge that has accumulated as a result of exposure from the photoelectric conversion element and a transfer transistor for controlling the transfer of the accumulated electrical charge of the photoelectric conversion element to the capacitor; and a reset transistor provided between the select transistor and the electrical charge holding circuit for discharging residual electrical charge of the capacitor prior to the start of exposure, wherein, while determining a horizontal correction coefficient for correcting the level of a photoelectric conversion signal that is outputted from the pixels corresponding with each point located on a horizontal coordinate axis that passes through a predetermined point of the image read area in the imaging face and a vertical correction coefficient for correcting the level of a photoelectric conversion signal that is outputted from the pixels corresponding with each point located on a vertical coordinate axis that passes through a predetermined point of the image read area in the imaging face, the level of the photoelectric conversion signal of each pixel is corrected by multiplying the photoelectric conversion signal that is outputted by each pixel in the image read area by the horizontal correction coefficient corresponding with the horizontal coordinate of each pixel and the vertical correction coefficient that corresponds with the vertical coordinate.

The area image sensor provided by the present invention is an area image sensor comprising a plurality of pixels arranged in a lattice shape on an imaging face for photoelectrically converting light of a subject optical image that is focused on the imaging face via an imaging optical system into an electrical signal in each pixel and outputting the electrical signal, each pixel comprising: a photoelectric conversion element that converts light rendered through exposure by accumulating electrical charge in accordance with a received light amount into an electrical signal; a select transistor for outputting to the outside accumulated electrical charge from the photoelectric conversion element following the end of exposure; one or two or more electrical charge holding circuits provided between the photoelectric conversion element and the select transistor that comprise a capacitor for temporarily holding electrical charge that has accumulated as a result of exposure from the photoelectric conversion element and a transfer transistor for controlling the transfer of the accumulated electrical charge of the photoelectric conversion element to the capacitor; and a reset transistor provided between the select transistor and the electrical charge holding circuit for discharging residual electrical charge of the capacitor prior to the start of exposure.

The area image sensor provided by the present invention is an area image sensor comprising a plurality of pixels arranged in a lattice shape on an imaging face for photoelectrically converting light of a subject optical image that is focused on the imaging face via an imaging optical system into an electrical signal in each pixel and outputting the electrical signal, wherein, while determining a horizontal correction coefficient for correcting the level of a photoelectric conversion signal that is outputted from the pixels corresponding with each point located on a horizontal coordinate axis that passes through a predetermined point of the image read area in the imaging face and a vertical correction coefficient for correcting the level of a photoelectric conversion signal that is outputted from the pixels corresponding with each point located on a vertical coordinate axis that passes through a predetermined point of the image read area in the imaging face, the level of the photoelectric conversion signal of each pixel is corrected by multiplying the photoelectric conversion signal that is outputted by each pixel in the image read area by the horizontal correction coefficient corresponding with the horizontal coordinate of each pixel and by the vertical correction coefficient that corresponds with the vertical coordinate.

The above-mentioned area image sensor may be constituted such that the electrical charge accumulation circuit has a constitution in which one electrode of the capacitor is connected to the output terminal of the transfer transistor and the other electrode is grounded; and the input terminal of the transfer transistor is connected to the photoelectric conversion element side and one electrode of the capacitor is connected to the reset transistor side.

Further, the above-mentioned area image sensor may be constituted such that, in each pixel, two of the electrical charge holding circuits are connected in series between the photoelectric conversion element and the select transistor and a second reset transistor for discharging residual electrical charge of the photoelectric conversion element prior to the start of exposure is connected to the input terminal of the photoelectric conversion element.

Further, the above-mentioned area image sensor may be constituted such that a plurality of signal lines for outputting photoelectric conversion signals from a plurality of pixels arranged in each column is provided in each column; a plurality of transfer control lines, reset lines, and address lines, which serve to control the ON/OFF of the transfer transistor, the reset transistor and the select transistor respectively of a plurality of pixels arranged in each row, are provided in each row; and the simultaneous exposure of all the pixels is started by simultaneously outputting reset signals and transfer signals to all of the reset lines and all of the transfer control lines respectively and the simultaneous exposure of all the pixels is subsequently terminated by outputting the transfer signals once again to all of the transfer control lines when a predetermined exposure time has elapsed, whereupon photoelectric conversion signals resulting from the simultaneous exposure of all the pixels are simultaneously outputted to each row from the plurality of pixels arranged in each row by sequentially outputting select signals to the address lines of each row in sync with a plurality of horizontal synchronization signals outputted in sync with a vertical synchronization signal.

Further, the above-mentioned area image sensor may be constituted such that a plurality of signal lines for outputting photoelectric conversion signals from a plurality of pixels arranged in each column is provided in each column; a plurality of transfer control lines, reset lines, and address lines, which serve to control the ON/OFF of the transfer transistor, the reset transistor and the select transistor respectively of a plurality of pixels arranged in each row, are provided in each row; and simultaneous exposure of all the pixels of a time that corresponds to the cycle of a vertical synchronization signal is repeated by simultaneously outputting a reset signal and transfer signal to all of the reset lines and all of the transfer control lines respectively in sync with the vertical synchronization signal and photoelectric conversion signals resulting from the simultaneous exposure of all the pixels of one exposure period earlier are simultaneously outputted to each row from the plurality of pixels arranged in each row by sequentially outputting select signals to the address lines of each row in sync with a plurality of horizontal synchronization signals outputted in sync with a vertical synchronization signal during each exposure period.

In addition, the above-mentioned area image sensor may comprise a plurality of A/D conversion means provided in each column that perform conversion to a digital signal by comparing the level of an analog photoelectric conversion signal that is outputted by a plurality of pixels arranged in each column with a predetermined reference level; first reference level setting means that set, for the A/D conversion means, a different reference level for each row in accordance with a value that is associated with the vertical correction coefficient when a photoelectric conversion signal is outputted by a plurality of pixels arranged in each row in row units; and second reference level setting means that set, for each of the A/D conversion means, a different reference level in accordance with a value that is associated with the horizontal correction coefficient.

Further, in the case of the above-mentioned area image sensor, the horizontal setting means may set a different reference level for each of the A/D conversion means by dividing the reference voltage by means of resistors.

Further, the above-mentioned area image sensor may comprise a plurality of A/D conversion means provided in each column that perform conversion to a digital signal by comparing the level of an analog photoelectric conversion signal that is outputted by a plurality of pixels arranged in each column with a predetermined reference level; first reference level setting means that set, for the A/D conversion means, a different reference level for each row in accordance with a value that is associated with the vertical correction coefficient when an analog signal is outputted by a plurality of pixels arranged in each row in row units; and second reference level setting means that count the output of each of the A/D conversion means with a predetermined count range serving as a reference and set a different count range for each of the A/D conversion means in accordance with a value that is associated with the horizontal correction coefficient.

In addition, the above-mentioned area image sensor may comprise horizontal correction coefficient storage means that pre-store a horizontal correction coefficient corresponding with each point located on a horizontal coordinate axis that passes through a predetermined point of the image read area; vertical correction coefficient storage means that pre-store a vertical correction coefficient corresponding with each point located on a vertical coordinate axis that passes through a predetermined point of the image read area; and multiplication means that multiply a photoelectric conversion signal that is outputted by each pixel in the image read area by a horizontal correction coefficient corresponding with a horizontal coordinate of the pixel that is stored in the horizontal correction coefficient storage means and by a vertical correction coefficient corresponding with a vertical coordinate of the pixel that is stored in the vertical correction coefficient storage means.

Further, the horizontal correction coefficient storage means may store the horizontal correction coefficient by thinning the horizontal correction coefficient, and the vertical correction coefficient storage means may store the vertical correction coefficient by thinning the vertical correction coefficient.

According to the area image sensor of the present invention, an electrical charge holding circuit comprising a capacitor for temporarily holding electrical charge that has accumulated as a result of exposure from a photoelectric conversion element and a transfer transistor for controlling the transfer of the accumulated electrical charge of the photoelectric conversion element to the capacitor is provided between the photoelectric conversion element of each pixel and the select transistor and, therefore, separation of the timing of the exposure operation of each pixel and the read timing of the photoelectric conversion signal obtained by the exposure operation is possible and, by sequentially reading the photoelectric conversion signals obtained by exposure from each pixel after exposing all the pixels with the same timing in row units in sync with the horizontal synchronization signal, for example, it is possible to obtain a pickup image with no image distortion even when the photographic subject is a moving object.

Further, a horizontal correction coefficient for correcting the level of the photoelectric conversion signal outputted by each pixel positioned on a horizontal coordinate axis that passes through a predetermined point of an image read region in the imaging face and a vertical correction coefficient for correcting the level of the photoelectric conversion signal outputted by each pixel positioned on a vertical coordinate axis that passes through a predetermined point of an image read region in the imaging face are set and, by multiplying each pixel in the photoelectric conversion signal outputted by each pixel by the horizontal correction coefficient and vertical correction coefficient corresponding to each pixel, the level of the photoelectric conversion signal of each pixel is corrected. Therefore, the capacity of the memory storing the correction coefficients for correcting the level of the photoelectric conversion signal can be markedly reduced.

BRIEF DESCRIPTION OF THE DRAWINGS

FIG. 1 is a constitutional view showing a first embodiment of the area image sensor according to the present invention;

BEST MODE FOR CARRYING OUT THE INVENTION

Figure 2:
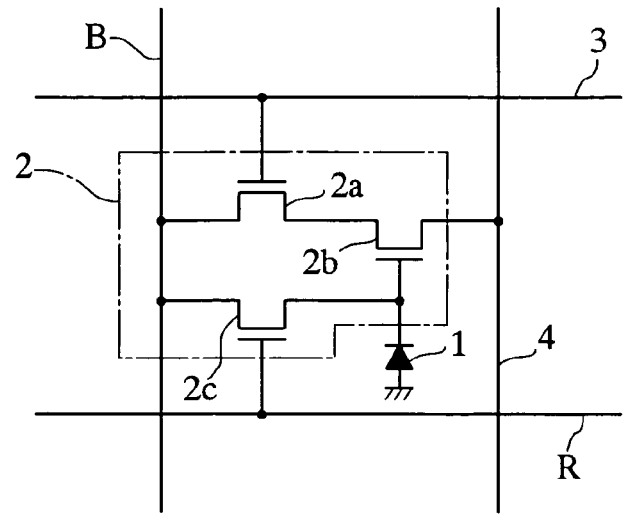
FIG. 2 is a circuit diagram of a photodiode and switching circuit.

Preferred embodiments of the present invention will be specifically illustrated hereinbelow with reference to the attached drawings.

FIG. 1 illustrates a constitutional view showing the first embodiment of the area image sensor of the present invention. This area image sensor is used in a digital camera or the like and comprises a horizontal image read area S. The image read area S is provided with photodiodes 1 constituting a plurality of photoelectric conversion elements arranged in a lattice shape, a plurality of switching circuits 2 connected to the photodiodes 1, address lines 3 extending in the row direction (horizontal direction), and read lines 4 extending in the column direction (vertical direction).

The photo diode 1 and switching circuit 2 constitute one pixel by combining one each of the photo diode 1 and switching circuit 2. The address lines 3 are provided in a plurality in the vertical direction for each of the plurality of horizontally arranged photodiodes 1. Each address line 3 is connected to a control portion 9 and a control signal (vertical synchronization signal) for controlling the ON/OFF of the plurality of select transistors 2a arranged in rows corresponding with each address line 3 is outputted by the control portion 9.

Further, the read lines 4 are provided in a plurality of in the horizontal direction for each of the plurality of vertically arranged photodiodes 1. Each read line 4 is connected to a plurality of A/D converters 6 provided for each read line 4 at the bottom of the image read area S.

The photodiodes 1 are elements that convert light into an electrical charge amount corresponding with the received light amount and accumulate the electrical charge. Although not illustrated in detail, the photodiodes 1 comprise a light-receiving face of a planar rectangular shape (not illustrated), for example, and receive light via this light-receiving face. Each photodiode 1 has the anode side thereof grounded and the cathode side thereof connected to a switching circuit 2.

The switching circuit 2 serves to read electrical charge that is accumulated by the photodiode 1 and, as shown in FIG. 2, is constituted by a select transistor 2a for selecting the photodiode 1, an amplification transistor 2b for amplifying and outputting the electrical charge amount that has accumulated in the photodiode 1, and a reset transistor 2c for discharging (resetting) the residual electrical charge of the photodiode 1.

The address line 3 is connected to the gate terminal of the select transistor 2a. The source terminal of the amplification transistor 2b is connected to the drain terminal of the select transistor 2a and the read line 4 is connected to the drain terminal of the amplification transistor 2b. The cathode terminal of the photodiode 1 is connected to the gate terminal of the amplification transistor 2b and the drain terminal of the reset transistor 2c is connected to the gate terminal of the amplification transistor 2b. The reset line R (not shown in FIG. 1) is connected to the gate element of the reset transistor 2c. Further, a bias line B (not shown in FIG. 1) is connected to the respective source terminals of the select transistor 2a and amplification transistor 2b.

Similarly to the address lines 3, a reset line R is provided in a plurality in correspondence with a plurality of pixels arranged in each row and connected to the control portion 9. Further, the bias line B is connected to the power supply. A control signal for controlling the ON/OFF of the plurality of reset transistors 2c arranged in rows corresponding with each reset line R is outputted by the control portion 9 to the reset line R.

As a result of this constitution, when a vertical synchronization signal (selection signal) is outputted by the control portion 9 (described subsequently) to the address lines 3, the select transistor 2a is turned ON. As a result, the amplification transistor 2b is turned ON and the cathode voltage of the photodiode is amplified by the amplification transistor 2b and outputted to the read lines 4 based on the electrical charge that has accumulated in the photodiodes 1. This output voltage is inputted to the A/D converter 6 (described subsequently) via the read lines 4.

Returning now to FIG. 1, a plurality of A/D converters 6 for converting an analog signal to a digital signal are each connected to the connection end of each read line 4. Shift registers 7 are each connected to the respective output terminals of the A/D converters 6 and the shift registers 7 are serially connected in a daisy chain shape. Further, the control portion 9 is connected to the A/D converters 6 via a voltage divider circuit 8.

Figure 3:
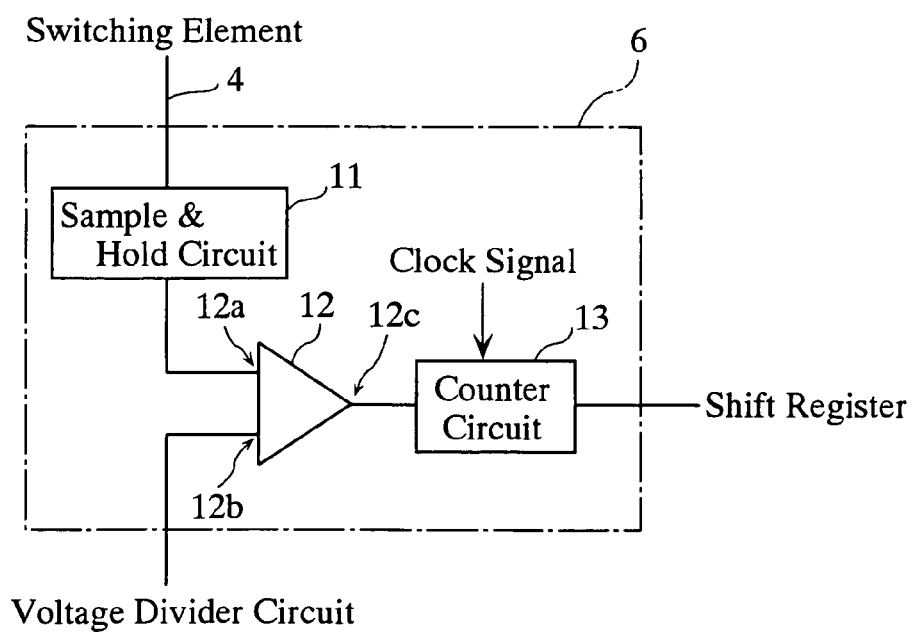
FIG. 3 is a block diagram of an A/D converter.

The A/D converter 6 has an overall constitution consisting of a sample & hold circuit 11, a comparator circuit 12, and a counter circuit 13, as shown in FIG. 3.

The sample & hold circuit 11 is a circuit that is connected to the read line 4 and which temporarily holds a signal (known as a 'pixel signal' hereinbelow) that has been read from each photodiode 1 via the read line 4.

The comparator circuit 12 is a circuit for comparing the voltage level of the pixel signal that is temporarily held by the sample & hold circuit 11 and the reference voltage that is outputted by the control portion 9. That is, one input terminal 12*a* of the comparator circuit 12 is connected to the sample & hold circuit 11 and the other input terminal 12*b* is connected to the voltage divider circuit 8.

Figure 4:
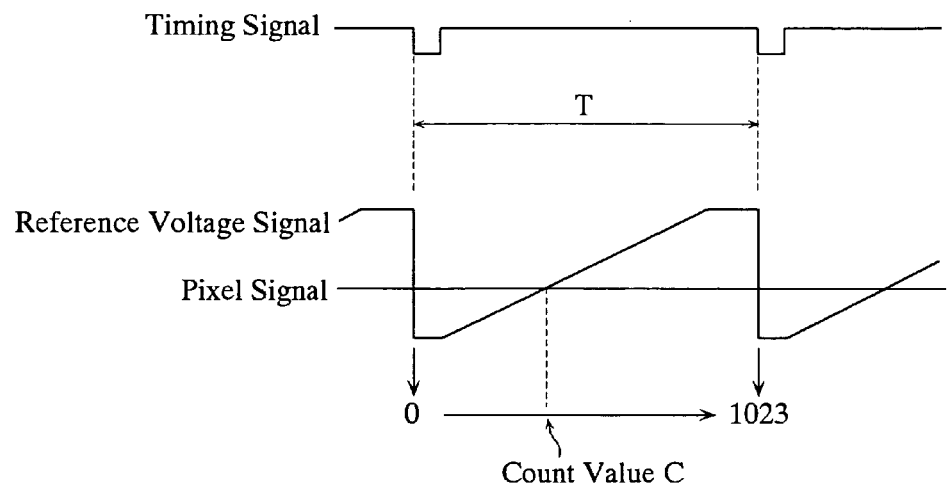
FIG. 4 is a timing chart of a reference voltage signal and pixel signal.

Here, when the switching circuit 2 of one line in the horizontal direction is selected by the select signal, the signal of the reference voltage varies in a slope shape and as time elapses in the selection time T as shown in FIG. 4 and has a waveform with a substantially saw shape so that this variation is repeated each selection time T. The cycle of the selection time T is prescribed in sync with the timing signal that is outputted by the control portion 9.

The comparator circuit 12 compares the voltage that is temporarily held by the sample & hold circuit 11 and the reference voltage and outputs a match signal when the two voltages match to the counter circuit 13. The counter circuit 13 is connected to the output terminal 12*c* of the comparator circuit 12 and repeatedly counts each selection time T '0' to '1023', for example, on the basis of a clock signal in sync with the selection time T that is outputted by the control portion 9. The counter circuit 13 is latched by a match signal from the comparator circuit 12 and outputs the count value C at the time of the latching to the shift register 7. This count value C converts the voltage level of the pixel signal to a digital value (pixel data).

The shift register 7 is constituted by a flip flop circuit or the like, the input terminal thereof being connected to the output of the counter circuit 13, and temporarily holds the count value C that is outputted by each counter circuit 13. The plurality of shift registers 7 provided in correspondence with each column are serially connected and the leading end is connected to a frame memory (not illustrated). The count value C (pixel data) held in each shift register 7 is sequentially outputted to the frame memory with predetermined timing in sync with a shift pulse. Pixel data is outputted to the shift register 7 in row units and, therefore, pixel data is stored in row units in the frame memory. Therefore, when the pixel data of all the rows is transferred to the frame memory, one frame's worth of image data is generated. In addition, a moving image is obtained as a result of a plurality of frames' worth of image data being successively generated.

The control portion 9 is the backbone of control of the area image sensor and outputs a select signal by scanning, for each address line 3, each switching circuit 2 as detailed earlier. The control portion 9 inputs a clock signal and timing signal to the A/D converter 6. Further, the control portion 9 inputs a reference voltage, which constitutes a comparison target for the pixel signal that is read from the photodiode 1, to the comparator circuit 12 of the A/D converter 6 via the voltage divider circuit 8.

Figure 5:
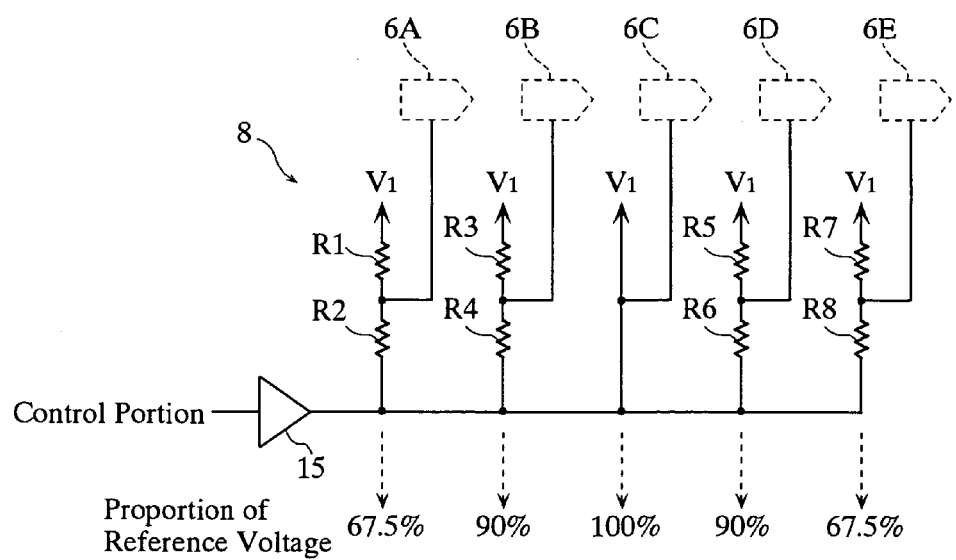
FIG. 5 is a circuit diagram showing an example of a voltage divider circuit.

The voltage divider circuit 8 is constituted by an amplifier 15 and a plurality of resistors R1 to R8, as shown in FIG. 5. The voltage divider circuit 8 divides the reference voltage and inputs the divided voltages to each A/D converter 6.

The amplifier 15 amplifies the reference voltage to a predetermined voltage value on the basis of a setting signal that is outputted by the control portion 9 and the resistors R1 to R8 divide the output voltage of the amplifier 15.

Further, in the voltage divider circuit 8 shown in FIG. 5, for the sake of expediency of the description, only resistors R1 to R8 and five A/D converters, which are the first to fifth A/D converters 6A, 6B, 6C, 6D, and 6E connected thereto, are mentioned. However, in reality, the resistors and A/D converters are provided in a number corresponding to the number of read lines 4. Further, the five A/D converters 6A, 6B, 6C, 6D, and 6E are connected to the read lines 4 corresponding to the photodiodes 1 arranged in the column direction of the image read area S and, more particularly, the third A/D converter 6C is connected via a read lines 4 to photodiodes 1 on a vertical coordinate axis that passes through the center of the image read area S.

Figure 6:
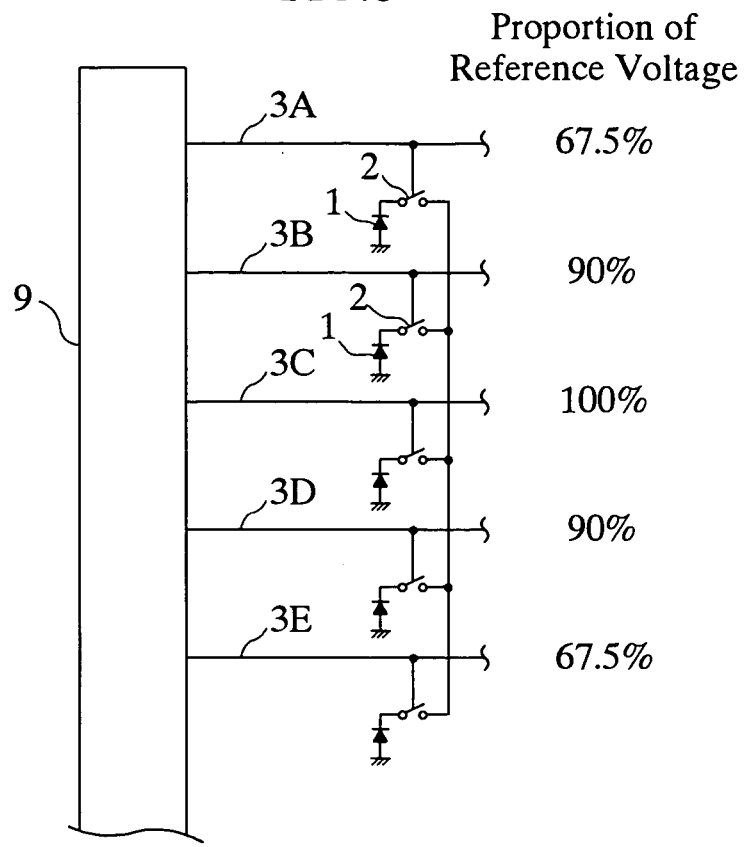
FIG. 6 shows an example of the constitution of the address lines.

Further, for the sake of expediency in the illustration, as shown in FIG. 6, only five address lines which are the first to fifth address lines 3A, 3B, 3C, 3D and 3E are provided and, more particularly, the third address line 3C is connected to photodiodes 1 arranged on a row direction coordinate axis that passes through the center of the image read area S.

Figure 7:
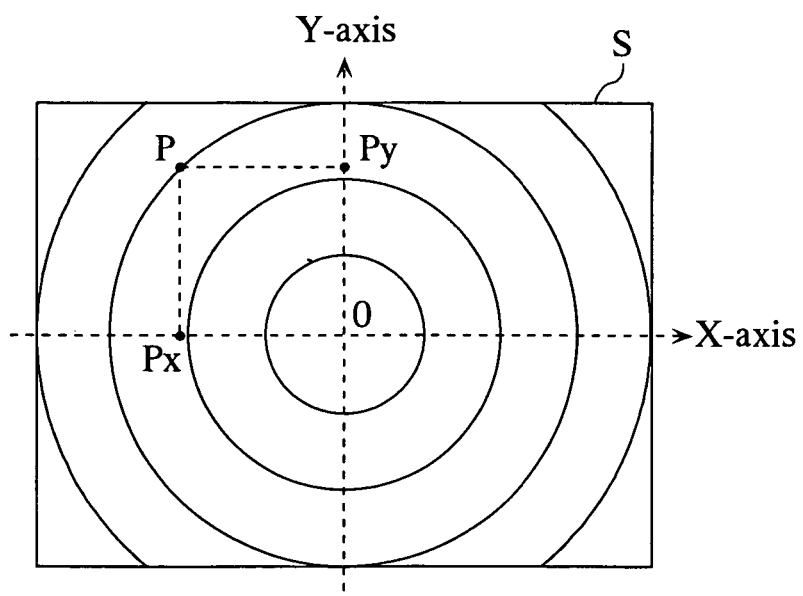
FIG. 7 shows the relationship between the amount of light received on the X and Y axes of the image read area.

As shown in FIG. 7, the present invention was conceived based on the knowledge that, when the received light amount at the point of origin O in the image read area S is the maximum received light amount (100%), the ratio of the received light amount at point Px on the X axis corresponding to the X coordinate of an optional point P in the image read area S with respect to the maximum received light amount and the ratio of the received light amount at point Py on the Y axis corresponding to the Y coordinate of an optional point P with respect to the maximum received light amount are substantially equal to the ratio of the received light amount at the optional point P with respect to the maximum received light amount.

That is, in order to obtain the same output value as the pixel receiving the maximum light amount at an optional point P in the image read area S, the reciprocal number of the ratio of the received light amount at point Px on the X axis corresponding to the X coordinate of an optional point P with respect to the maximum received light amount and the reciprocal number of the ratio of the received light amount at point Py on the Y axis corresponding to the Y coordinate of an optional point P with respect to the maximum received light amount may be used and these reciprocal numbers may be multiplied by the output value of the pixel at optional point P.

More specifically, supposing that the ratio of the received light amount at point Px in FIG. 7 with respect to the received light amount (maximum received light amount) at the point of origin O is 80% and the ratio of the received light amount at point Py with respect to the received light amount (maximum received light amount) at the point of origin O is 80%, the ratio of the received light amount at point P with respect to the maximum received light amount is 64%. Therefore, if the output value of the light-receiving element at point P is multiplied by (100/80), which is the reciprocal number of the ratio of the light amount at point Px with respect to the maximum light amount at the point of origin O, and by (100/80), which is the reciprocal number of the ratio of the light amount at point Py with respect to the maximum light amount at the point of origin O, because 64×(100/80)×(100/80)=100, the output value of the light-receiving element at point P is corrected so as to be equal to the output value of the pixel at the point of origin O.

As a result, a horizontal correction coefficient corresponding with each point located on a horizontal coordinate axis (corresponds to the X axis in FIG. 7) that passes through a predetermined point (the center, for example) of the image read area S and a vertical correction coefficient corresponding to each point located on a vertical coordinate axis (corresponds to the Y axis in FIG. 7) that passes through the center of the image read area S are established, the pixel signal from each photodiode 1 of the image read area S is multiplied by a horizontal correction coefficient corresponding with the horizontal coordinate (X coordinate) of the photodiode 1 and a vertical correction coefficient that corresponds with the vertical coordinate (Y coordinate) of the photodiode 1.

Here, the horizontal correction coefficient is established on the basis of the reciprocal number of the ratio of the received light amount of the photodiode 1 arranged on the horizontal coordinate axis with respect to the received light amount (maximum received light amount) of the photodiode 1 located at the center of the image read area S and, if the horizontal correction coefficient is established on the basis of the reciprocal number of the ratio of the received light amount of the photodiode 1 arranged on the horizontal coordinate axis with respect to the received light amount (maximum received light amount) of the photodiode 1 located at the center of the image read area S, the level of the pixel signal from the photodiode 1 at each point in the image read area Scan be corrected to substantially the same level as the pixel signal from the photodiode 1 that receives the received light amount.

The constitution of this embodiment is the same as, by way of an example, multiplying the output value of each photodiode by the horizontal correction coefficient and the vertical correction coefficient by setting and changing the reference voltage for each A/D converter 6 in association with the horizontal correction coefficient and vertical correction coefficient. The operation of this constitution will be described specifically hereinbelow.

First, a case where a reference voltage is set for an A/D converter 6 in the Y-axis direction (vertical direction) in FIG. 7 will be described. The control portion 9 sequentially outputs a select signal for turning ON the switching circuit 2 to the address lines 3. Here, the control portion 9 sets a reference voltage with a different value in accordance with the value associated with the A/D direction correction coefficient for the A/D converter 6 each time the select signal is outputted to the address lines 3.

For example, supposing that the reference voltage when the select signal is outputted to the third address line 3C shown in FIG. 6 is a normalization reference voltage (100%), when the control portion 9 outputs a select signal to the first address line 3A, the reference voltage of the A/D converter 6 is set to a reference voltage that is substantially 67.5%, for example, of the regular reference voltage. That is, the control portion 9 inputs a set signal to the amplifier 15 of the voltage divider circuit 8 so that the amplitude of the reference voltage is substantially 67.5% of the regular reference voltage. As a result, the amplifier 15 inputs a reference voltage the amplitude of which is a 0.675 multiple to the A/D converter 6.

Thereafter, when the control portion 9 outputs a select signal to the second address line 3B, the reference voltage of the A/D converter 6 is set to a reference voltage that is substantially 90.0%, for example, of the regular reference voltage. The control portion 9 outputs the regular reference voltage as is when outputting a select signal to the third address line 3C. Further, when the control portion 9 outputs the select signal to the fourth address line 3D, the reference voltage of the A/D converter 6 is set to substantially 90.0%, for example, of the regular reference voltage. Further, when the control portion 9 outputs the select signal to the fifth address line 3E, the reference voltage of the A/D converter 6 is set to a reference voltage that is substantially 67.5%, for example, of the regular reference voltage.

Each of the above proportions of the regular reference voltage are decided in advance by assuming a case where there are five address lines 3. In an actual area image sensor, the number of address lines 3 is greater than in the above example and the values differ according to the number of address lines 3. In this embodiment, the ratio of the photodiodes 1 that are connected to the first address line 3A, for example, with respect to the maximum light amount of the light amount at a point on the vertical coordinate is 67.5% and this value is the value linked to the vertical correction coefficient.

Figure 8:
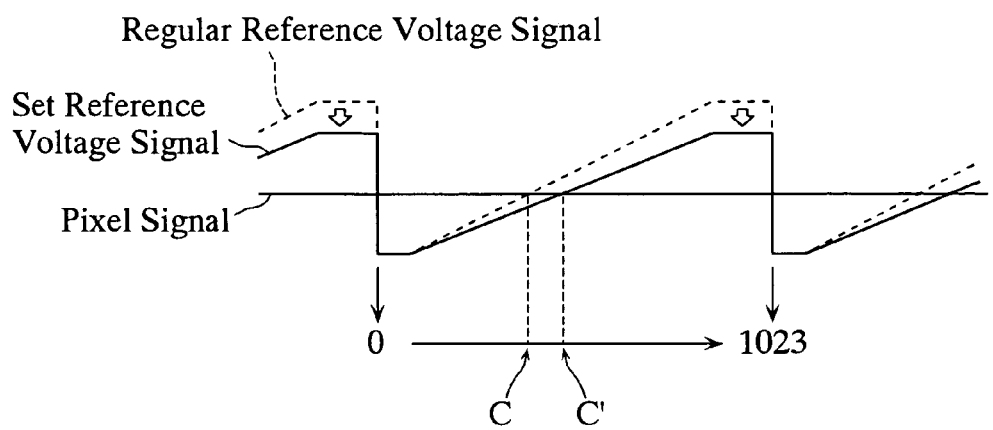
FIG. 8 is a timing chart of a reference voltage signal and pixel signal.

Thus, when the control portion 9 sets a reference voltage for the A/D converter 6, a reference voltage the amplitude of which is reduced by a predetermined proportion is inputted as shown in FIG. 8 to the other input terminal 12b of the comparator circuit 12 of the A/D converter 6.

Normally, the voltage value of the pixel signal from the photo diode 1 that is held by the sample & hold circuit 11 is inputted to one input terminal 12a of the comparator circuit 12. Further, the comparator circuit 12 compares the reference voltage and the voltage value of the pixel signal and, when there is a match between the value of the reference voltage and the voltage value of the pixel signal, the match signal is outputted to the counter circuit 13. As a result, a count value C is counted by the counter circuit 13. The output of the counter circuit 13 is sent to the shift register 7 and is the regular output value of the photodiode 1.

As detailed earlier, when a reference voltage the amplitude of which is reduced by a predetermined proportion is inputted to the comparator circuit 12, even when the same pixel signal is inputted, the timing at which there is a match between the value of the reference voltage and the voltage value of the pixel signal is delayed. As a result, the counter circuit 13 counts a count value C' that is larger than the count value C and there is an apparent increase in the output value of the photodiode 1.

On the other hand, when a case where a reference voltage is set for an A/D converter 6 in the X-axis direction (horizontal direction) in FIG. 7, in the horizontal direction, the reference voltage that is supplied to each A/D converter 6 differs as a result of voltage division by the respective resistors R1 to R8 of the voltage divider circuit 8 in accordance with the value associated with the horizontal correction coefficient. That is, as shown in FIG. 5, a reference voltage that is voltage-divided on the basis of the resistance ratio between the first resistor R1 and second resistor R2 is supplied to the first A/D converter 6A. More specifically, the resistance ratio between the first resistor R1 and second resistor R2 is 675:325, for example, and, therefore, a voltage of 67.5% of the regular reference voltage is inputted to the first A/D converter 6A as the reference voltage.

Further, because the resistance ratio between the third resistor R3 and fourth resistor R4 is 9:1, for example, a voltage that is 90% of the regular reference voltage is inputted as the reference voltage to the second A/D converter 6B. Because a resistance is not connected to the third A/D converter 6C, the reference voltage amplified by the amplifier 15 is inputted as is to the third A/D converter 6C. Further, because the resistance ratio between the fifth resistor R5 and sixth resistor R6 is 9:1, for example, a voltage that is 90% of the regular reference voltage is inputted as the reference voltage to the fourth A/D converter 6D. In addition, because the resistance ratio between the seventh resistor R7 and eighth resistor R8 is 675:325, for example, a voltage that is 67.5% of the regular reference voltage is inputted as the reference voltage to the fifth A/D converter 6E.

Further, the respective proportions of the regular voltage of the divided voltage ratios of the resistors are values that are decided in advance by assuming a case where there are five read lines 4. In an actual area image sensor, the number of read lines 4 is greater than in the above example and the values differ according to the number of read lines 4. In this embodiment, the ratio of the photodiodes 1 that are connected to the first A/D converter 6A, for example, with respect to the maximum light amount of the light amount at a point on the horizontal coordinate is 67.5% and this value is the value linked to the horizontal correction coefficient. Therefore, the ratio of the photodiodes 1 that are connected to the first address line 3A and the first A/D converter 6A, with respect to the maximum light amount of the light amount at a point in the image read area S is found by 67.5×67.5 and is substantially 45.5%.

Figure 9:
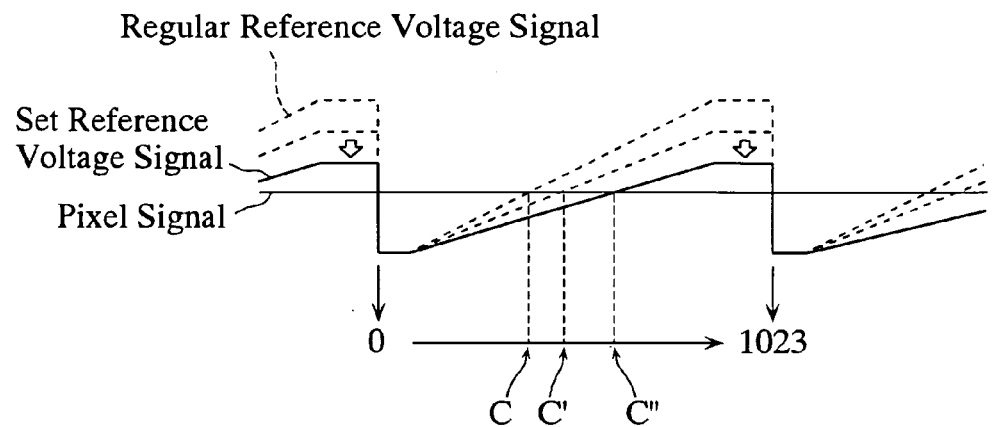
FIG. 9 is a timing chart of a reference voltage signal and pixel signal.

In a case where the reference voltage of the A/D converter 6 is set in the vertical direction, the reference voltage (see FIG. 8) the amplitude of which is reduced has the amplitude thereof further reduced by reducing, as mentioned earlier, the reference voltage that is supplied to the first, second, fourth, and fifth A/D converters 6A, 6B, 6D, and 6E respectively by a predetermined proportion by means of the voltage divider circuit 8, as shown in FIG. 9. As a result, the comparator circuit 12 of the first A/D converter 6A, for example, compares the reference voltage with the further reduced amplitude and the pixel signal.

Further, the match signal at this time is outputted to the counter circuit 13 and the counter circuit 13 outputs a count value C" that is higher than the count value C' to the shift register 7. The output of the count circuit 13 is sent to the shift register 7 and constitutes the regular output value of the photodiode 1. However, because the count value C" is a higher value than the count value C', there is an apparent increase in the output value of the photodiode 1.

Here, when the amplitude of the reference voltage is reduced by a predetermined proportion, although the count value (the output value of the photodiode 1) that is counted by the counter circuit 13 increases, in this case, the proportion of the increase in the count value has an exactly reciprocal number relationship with respect to the proportion of the reference voltage set for the A/D converter 6.

Figure 10:
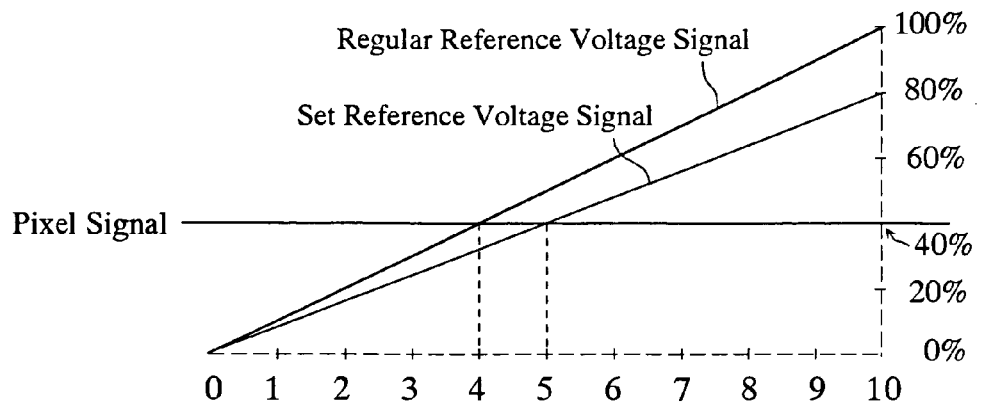
FIG. 10 shows the relationship between the reference voltage signal and pixel signal.

FIG. 10 shows the variation in the count value with respect to the variation in the amplitude of the reference voltage. Further, FIG. 10 shows, for the sake of expediency of the description, only the inclined part of the substantially saw-shaped waveform as a reference voltage and the count range of this part being set at '1' to '10'. Here, when a case where the amplitude of the reference voltage is reduced in the proportion 80% is assumed, the count value is a 1.25 multiple of from '4' to '5', for example, and exactly matches (100/80), which is a reciprocal number of a proportion of the regular reference voltage.

That is, in a case where the final output value of an optional photodiode 1 in the image read area S is the same as the output value of a photodiode with a maximum received light amount, the ratio of the received light amount of the photodiode 1 on the horizontal coordinate axis corresponding to the horizontal coordinate of the photodiode 1 with respect to the maximum received light amount and the ratio of the received light amount of the photodiode 1 on the vertical coordinate axis corresponding to the vertical coordinate of the photodiode 1 may each be set as the proportions of the reference voltage for the A/D converter 6.

In other words, setting the ratios for the A/D converter 6 as proportions of the reference voltage is equivalent to multiplying the output value of an optional photodiode 1 by the reciprocal number (horizontal correction coefficient) of the ratio of the received light amount at a point on the horizontal coordinate axis corresponding to the horizontal coordinate of the photodiode 1 with respect to the maximum received light amount and the reciprocal number (vertical correction coefficient) of the ratio of the received light amount at a point on the vertical coordinate axis corresponding to the vertical coordinate of the photodiode 1 with respect to the maximum received light amount, whereby the output value of the photodiode 1 can be corrected.

Figure 11:
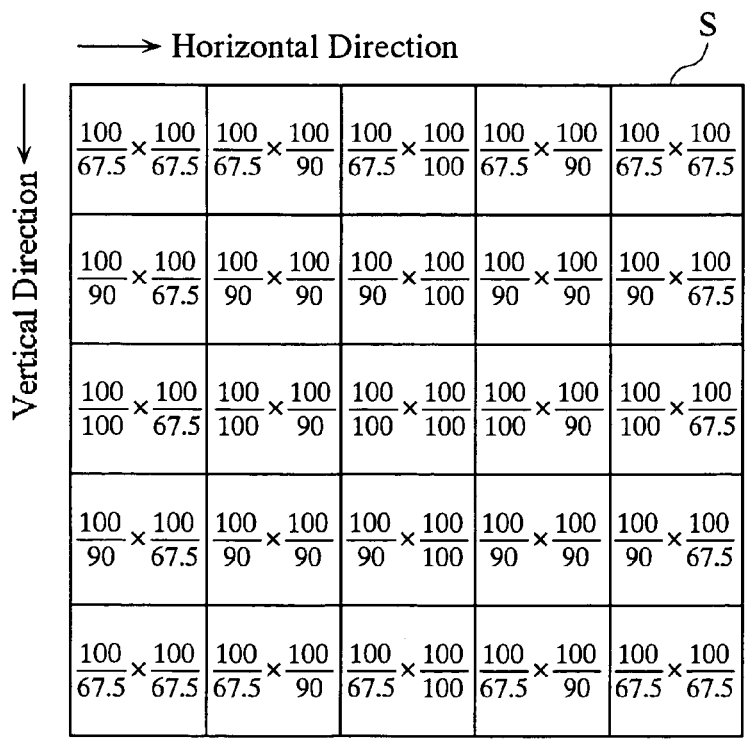
FIG. 11 shows the ratio with respect to the maximum amount of light received of the received light amounts of the photodiodes arranged in horizontal and vertical directions.

For example, as shown in FIG. 11, the ratio of the received light amount at a point on the horizontal coordinate axis corresponding to the horizontal coordinate of the photodiode 1 with respect to the maximum received light amount is 67.5% for the photodiode 1 disposed in the first row and first column among the respective photodiodes 1 arranged in five rows and five columns and the ratio of the received light amount at a point on the vertical coordinate axis corresponding to the vertical coordinate of the photodiode 1 with respect to the maximum received light amount is 67.5%. Therefore, the ratio of the received light amount at a point in which the photodiode 1 is located that is disposed in the first row and first column with respect to the maximum received light amount is substantially 45.5%, as mentioned earlier.

As a result, if the received light amount at the point in which the photodiode 1 disposed in the first row and first column is located is multiplied by (100/67.5), which is the reciprocal number of the ratio of the received light amount at a point on the horizontal coordinate axis corresponding to the horizontal coordinate of the photodiode 1 with respect to the maximum received light amount, and by (100/67.5), which is the reciprocal number of the ratio of the received light amount at a point on the horizontal coordinate axis corresponding to the horizontal coordinate of the photodiode 1 with respect to the maximum received light amount, because 45.5×(100/67.5)×(100/67.5)=100, the output value of the photodiode 1 can be corrected so as to be equal to the output value of the photodiode 1 of the maximum received light amount.

Although, conventionally, a correction value is provided for the output values of all the photodiodes 1 in the image read area S or for the output value of the photodiode 1 in one quadrant, in this embodiment, the output value of an optional photodiode 1 in the image read area S can be easily corrected simply by a providing a correction coefficient for each point located on the horizontal coordinate axis and each point located on the vertical coordinate axis. The memory capacity can therefore be easily reduced. Further, the output of the whole of the image sensor may be reduced as in a case of using an ND filter.

Figure 12:
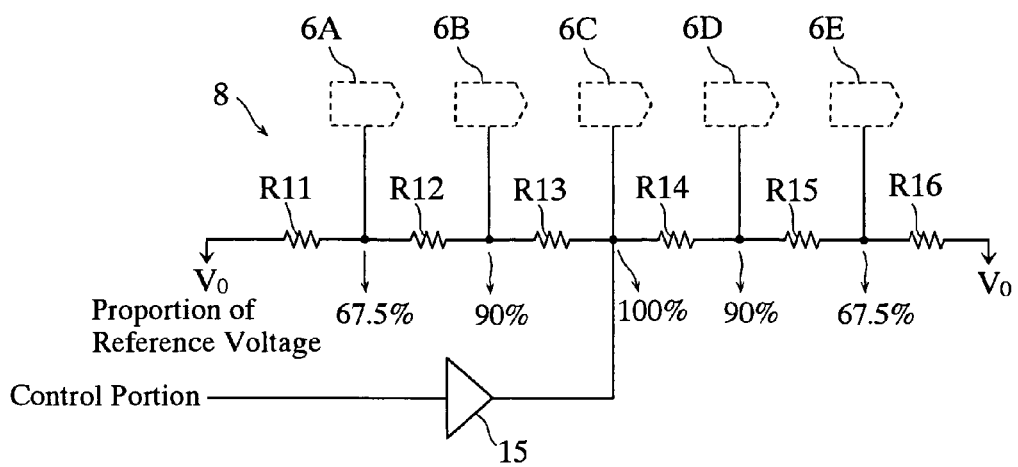
FIG. 12 is a circuit diagram showing an example of a voltage divider circuit.

Further, in addition to the circuit constitution shown in FIG. 5, the constitution of the voltage divider circuit 8 may be a circuit constitution in which the reference voltage supplied to the comparator circuit 12 of each of the A/D converters 6A to 6D is serially divided by resistors R11 to R16, as shown in FIG. 12.

That is, the third A/D converter 6C is serially connected to the amplifier 15 and the second A/D converter 6B is connected to the amplifier 15 via the resistor R13. Further, the first A/D converter 6A is connected to the amplifier 15 via the resistors R12 and R13 and the fourth A/D converter 6D is connected to the amplifier 15 via the resistor R14. Further, the fifth A/D converter 6E is connected to the amplifier 15 via the resistors R14 and R15. One end of the resistor R11 is connected to the resistor R12, while the other end is connected to a predetermined potential $V_0$. Further, one end of the resistor R16 is connected to the resistor R15, while the other end is connected to the predetermined potential $V_0$.

As a result of this constitution, the reference voltage that is supplied to the respective A/D converters 6A, 6B, 6C, 6D, and 6E differs according to the values of each of the resistors R11 to R16 in accordance with a value associated with the horizontal correction coefficient. More specifically, the reference voltage is inputted as is to the third A/D converter 6C and a voltage that is 90%, for example, of the regular reference voltage is inputted as the reference voltage to the second and fourth A/D converters 6B and 6D respectively. Further, a voltage of 67.5%, for example, of the regular reference voltage, is inputted as the reference voltage to the first and fifth A/D converters 6A and 6E respectively. Therefore, this constitution affords the same operating results as those of the circuit constitution shown in FIG. 5.

Figure 13:
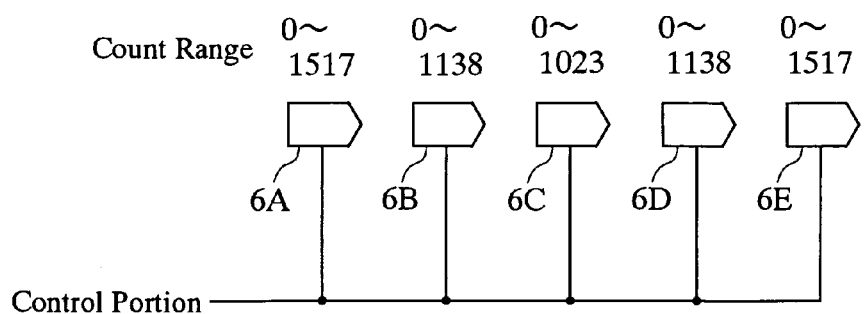
FIG. 13 shows an example of the count range of the A/D converter.

Further, in addition to providing this voltage divider circuit 8, the count range (count addition value) of the counter circuit 13 of the respective A/D converters 6A to 6D may be set differently in accordance with the value associated with the horizontal correction coefficient for each of the A/D converters 6A to 6D, as shown in FIG. 13.

That is, although, in this embodiment, the counter circuit 13 counts between '0' and '1023', the counter circuits 13 may be such that only the counter circuit of the third A/D converter 6C counts between '0' and '1023', while the counter circuit 13 of the second and fourth A/D converters 6B and 6D count between '0' and '1138', for example, and the respective counter circuits 13 of the first and fifth A/D converters 6A and 6E respectively count between '0' and '1517', for example. Such setting and changing of count ranges can be performed easily by changing the clock frequency that is inputted to the counter circuit 13.

Further, values indicating count ranges such as '1138' and '1517' are values that are determined beforehand by assuming a case where there are five read lines 4.

As shown in FIG. 8, when the output values of the photodiodes 1 arranged in the column direction are corrected for each row, the counter circuit 13 counts the count value C' in accordance with a match signal that is outputted by the comparator circuit 12. Further, if the count range of the counter circuit 13 of the respective A/D converters 6A to 6D are set differently, one of the counter circuits 13 with a broad count range can count a large value. Therefore, there is an apparent increase in the output value of the photodiode 1.

As a result, the same operating results as for the circuit constitution in which the voltage divider circuit 8 was provided can be afforded and, as a result of being able to omit the voltage divider circuit 8, the product costs can be considerably reduced.

Further, the above correction method can also be applied to a case where a DSP is installed in an area image sensor.

Figure 14:
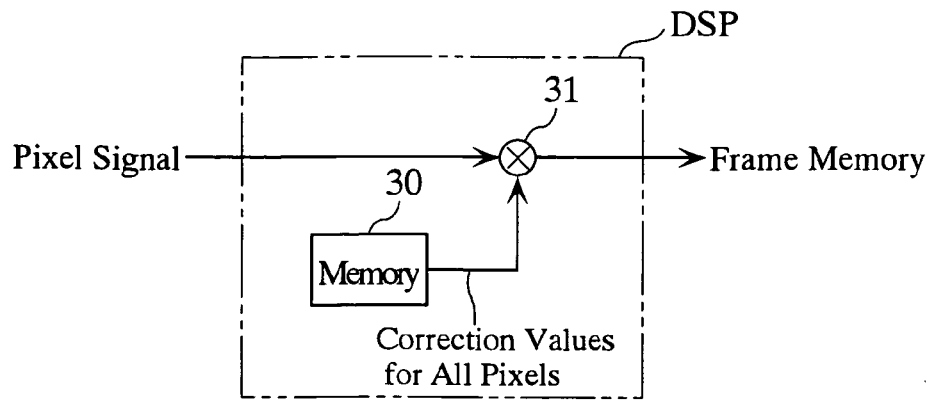
FIG. 14 shows a conventional DSP block constitution.

That is, conventionally, in a method that uses DSP, as shown in FIG. 14, all the output values that are read from all the photodiodes 1 are read from the memory 30 with the reciprocal number of the ratio of the received light amount at the point where the photodiode 1 is located with respect to the maximum received light amount serving as the correction value and, by multiplying the output values by means of a multiplier 31, the light amount of the image read area S is rendered substantially uniform. In this method, the memory capacity is increased because all the photodiodes 1 must have a correction value.

Figure 15:
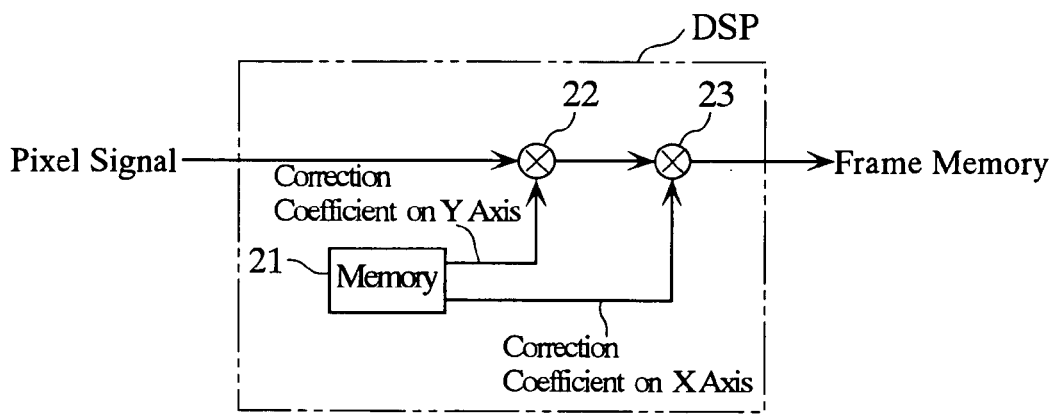
FIG. 15 shows a DSP block constitution in a case where a DSP is applied to the area image sensor of the present invention.

In this embodiment, as shown in FIG. 15, the horizontal correction coefficient corresponding to each point on the horizontal coordinate axis that passes through the center of the image read area S and the vertical correction coefficient corresponding to each point on the vertical coordinate axis that passes through the center of the image read area S are each stored in the memory 21.

Further, the actual output values of the photodiode 1 are multiplied by the vertical correction coefficient corresponding with the horizontal coordinate of the photodiode 1 by means of a multiplier 22 and by a vertical correction coefficient that corresponds with the vertical coordinate of the photodiode 1 by means of a multiplier 23.

Thus, because only the horizontal correction coefficient and vertical correction coefficient need be stored, in comparison with a case where all the photodiodes 1 have their respective correction values, not only can the memory capacity be markedly reduced, a reduction in the product cost can be achieved. Moreover, greater results are exhibited as the number of pixels increases.

Figure 16:
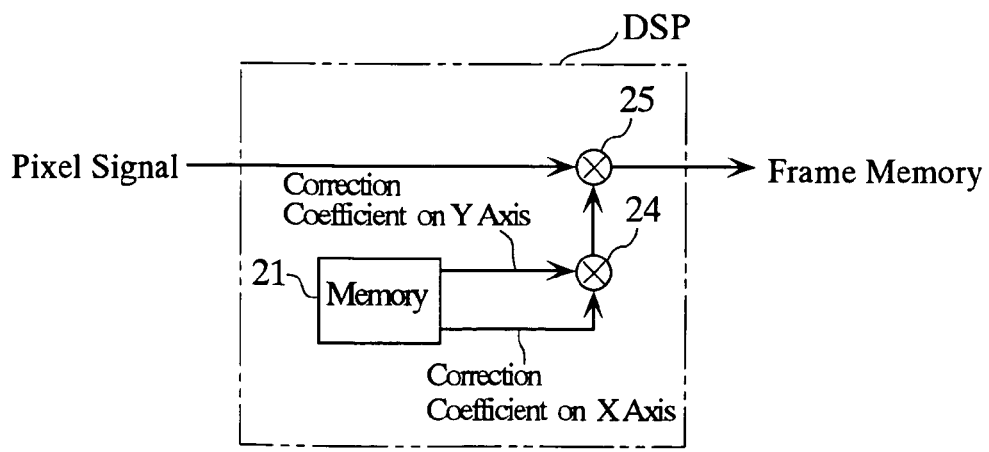
FIG. 16 shows another block constitution of a DSP in a case where the area image sensor of the present invention is applied to a DSP.

Further, the method for multiplying the correction coefficients may be a method in which, as shown in FIG. 16, the horizontal correction coefficient corresponding with the horizontal coordinate of the photodiode 1 and the vertical correction coefficient corresponding with the vertical coordinate are multiplied beforehand by the multiplier 24 and then the multiplication result is then multiplied by the actual output value of the photodiode 1 by means of a multiplier 25.

Further, the horizontal correction coefficient and vertical correction coefficient may be stored as data that is thinned out beforehand. That is, one correction coefficient is stored in the memory for each of a plurality of columns and one correction coefficient is stored for each of a plurality of rows. As a result, the memory capacity can be further reduced.

Further, the first embodiment above improves degradation of the image quality of the pickup image based on the non-uniformity of the light amount of the subject optical image that is focused on the imaging face. However, a second embodiment that improves image distortion that is produced as a result of performing the exposure operation by providing a time difference for each row will be described next.

In the case of the CMOS area image sensor according to the second embodiment, the constitution of each pixel is different from that of the CMOS area image sensor according to the first embodiment and the exposure control method is different based on this difference in constitution.

Therefore, in the following description, the pixel constitution and exposure control of the MOS-type area image sensor according to the second embodiment will be described.

Figure 17:
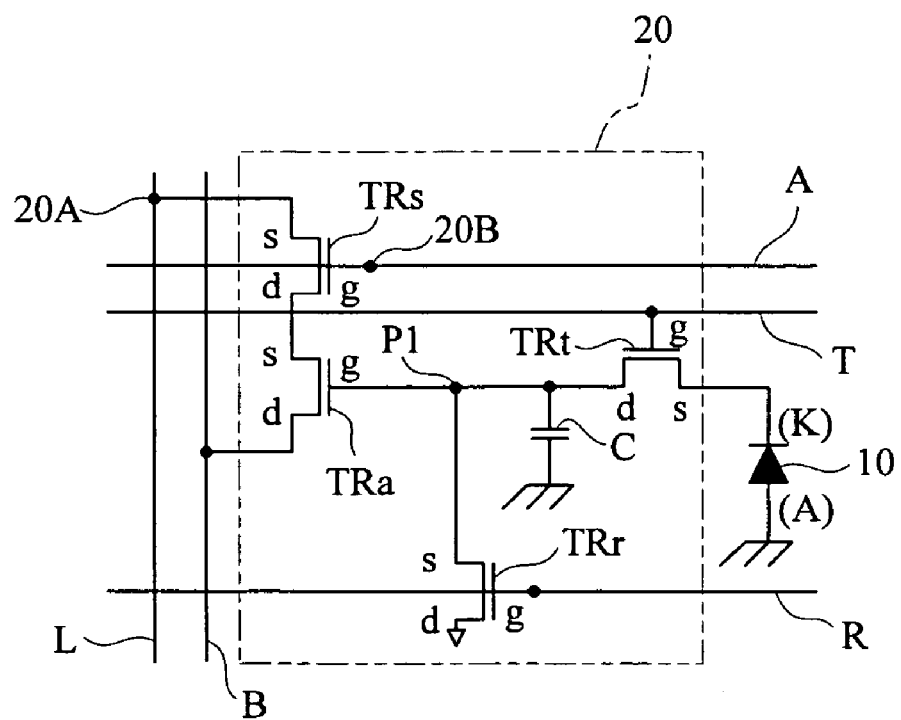
FIG. 17 is a circuit diagram showing a constitution corresponding to one pixel of a second embodiment of the area image sensor of the present invention.

FIG. 17 is a circuit diagram showing the constitution corresponding to one pixel of the CMOS area image sensor according to the second embodiment.

Each pixel of the CMOS area image sensor of the second embodiment is constituted by a photodiode 10 and a switching circuit 20 that is connected to the photodiode 10. The photodiode 10 corresponds to the photodiode 1 of the area image sensor according to the first embodiment above.

The switching circuit 20 is constituted by a transfer transistor TRt, a capacitor C, a reset transistor TRr, an amplification transistor TRa, and a select transistor TRs. The select transistor TRs, reset transistor TRr, and amplification transistor TRa each correspond to the select transistor 2a, reset transistor 2c, and amplification transistor 2b that constitute the switching circuit 2 of the area image sensor of the first embodiment above. The capacitor C temporarily holds the electrical charge that has accumulated in the phototransistor 10 as a result of an exposure operation. Further, the transfer transistor TRt is a switching element for controlling the transfer of electrical charge that has accumulated in the photo transistor 10 to the capacitor C.

The cathode (output terminal) of the photodiode 10 is connected to the source (input terminal) of the transfer transistor TRt and the anode thereof is grounded. The transfer transistor TRt consists of an N-channel junction-type FET (Field Effect Transistor), the drain (output terminal) thereof being connected to the main electrode of the capacitor C, and the gate thereof being connected to a transfer control line T. The transfer control line T is a signal line for inputting a control signal for controlling the ON/OFF of the transfer transistor TRt and, similarly to the address lines 3, a plurality of the transfer control lines T are provided in correspondence with the plurality of pixels arranged in each row and are each connected to the control portion 9.

The main electrode of the capacitor C is connected to the connection point P1 between the source (input terminal) of the reset transistor TRr and the gate of the amplification transistor TRa, and the other electrode of the capacitor C is grounded. The reset transistor TRr consists of an N-channel junction-type FET, the gate of which is connected to the reset line R. The amplification transistor TRa consists of a P-channel junction-type FET, the drain of which is connected to the address line B, and the source (output terminal) of which is connected to the drain of the select transistor TRs. The select transistor TRs consists of a P-channel junction-type FET, the source (output terminal) thereof being connected to the signal line L and the gate thereof being connected to the address line A.

When a control signal (referred to as a 'transfer signal' hereinbelow) is inputted by the control portion 9 via the transfer control line T, the transfer transistor TRt is switched ON and the electrical charge that has accumulated in the photodiode 10 is transferred to the capacitor C. Therefore, implementation of the exposure is such that the exposure is started at a time when the transfer transistor TRt is switched from ON to OFF (exposure start time) and, when the transfer transistor TRt is then turned from OFF to ON (exposure end time) the electrical charge that has accumulated in the photodiode 10 thus far is all transferred to the capacitor C.

While the reset transistor TRr is OFF when the reset signal is inputted from the control portion 9 via the reset line R, the pixel signal is free to move from the connection point P1 to the amplification transistor TRa. Conversely, when the reset transistor TRr is switched ON, the electrical charge that has accumulated in the capacitor C is discharged to the outside via the connection point P1 and the reset transistor TRr. That is, when the reset transistor TRr is turned on, the residual electrical charge in the capacitor C is discharged (reset) to outside the circuit and the residual electrical charge (electrical charge that has accumulated as a result of the exposure operation) can be transferred from the photodiode 10 to the capacitor C.

The amplification transistor TRa functions as a source follower. The amplification transistor TRa amplifies the pixel signal (voltage of the capacitor C) inputted to the gate and outputs the amplified pixel signal to the switching transistor TRs. When a select signal is inputted by the control portion 9 via the address line A, the select transistor TRs is switched ON and causes the amplification transistor TRa to operate. That is, when the select transistor TRs is switched ON, the amplified pixel signal is outputted by the amplification transistor TRa and outputted to the signal line L via the select transistor TRs. The pixel signal is inputted to the A/D converter 6 via the signal line L.

As mentioned earlier, the A/D converter 6 converts a pixel signal constituting an analog signal to digital image data and outputs same in sync with a select signal (horizontal synchronization signal). The select transistor TRs turns ON in sync with the select signal and the pixel signal that is outputted by the amplification transistor TRa (signal rendered by amplifying the pixel signal based on the electrical charge that has accumulated in the capacitor C) is inputted to the A/D converter 6 via the signal line L. Therefore, the A/D conversion operation of the A/D converter 6 is performed each time the pixel signal is read in each row. Further, the pixel data that is generated by the A/D converter 6 in each row is transferred to frame memory sequentially via the shift register 7.

As mentioned earlier, the control portion 9 controls the output of the select signal to the respective address lines 3, the output of the reset signal to the respective reset lines R, and the output of the transfer signal to the respective transfer control lines T. The control portion 9 controls the output timing of the output of the select signal, reset signal, and transfer signal on the basis of a vertical synchronization signal and a horizontal synchronization signal.

The select signal is a signal for selecting the row from which the pixel signals are to be read and is outputted sequentially from the uppermost row to the lowermost row in sync with the horizontal synchronization signal. In the plurality of pixels arranged in the row to which the select signal is outputted, the select transistors TRs are switched ON at the same time and the pixel signals are outputted to the A/D converter 6 via the signal line L.

The reset signal is a signal for discharging electrical charge that has accumulated in the capacitor C and is a high-level pulse signal, for example. The transfer signal is a signal for controlling the transfer of the accumulated electrical charge in the photodiode 10 to the capacitor C and is substantially a signal for controlling the exposure operation of the photodiode 10. When a high-level transfer signal is outputted to the transfer control line T, in the plurality of pixels arranged in the row corresponding with the transfer control line T, the transfer transistors TRt turn ON at the same time and the electrical charge that has accumulated as a result of the exposure operation of the photodiode 10 is transferred to the capacitor C. Thereafter, when a low-level transfer signal is outputted to the transfer control line T, in the plurality of pixels arranged in the row corresponding with the transfer control line T, the transfer transistors TRt turn OFF at the same time and, with the timing at which the transfer signal is inverted from the high level to the low level, the transfer of electrical charge from the photodiode 10 to the capacitor C is prohibited and exposure is started.

Because the electrical charge that has accumulated in the photodiode 10 as a result of the exposure operation is transferred to the capacitor C after the capacitor C is reset, the transfer signal is outputted at the same time as or after the reset signal.

In the case of the CMOS area image sensor of the second embodiment, the electrical charge that has accumulated in the photodiode 10 is transferred to the capacitor C and temporarily saved. Hence, the exposure operation of the photodiode 10 and the operation to read the accumulated electrical charge can be separated.

The above-mentioned conventional CMOS area image sensor and the CMOS area image sensor of the first embodiment are constituted such that accumulated electrical charge of the photodiode 10 is read immediately when exposure ends and the next exposure operation is started at the same time. Therefore, when the exposure start/end timings of all the pixels are the same, pixel signals are outputted to each signal line L by the plurality of pixels arranged in a vertical direction in the corresponding column and these pixel signals are mixed and inputted to the A/D converter 6. Hence, there has been a need to shift the exposure start/end timing of the pixels in row units. As a result, there has been a shift in the exposure time in row units on the imaging screen and, in the case of a moving body that is moving at high speed, image distortion has resulted.

In the case of the CMOS area image sensor of the second embodiment, the exposure operation of the photodiode 10 and the operation to read the accumulated electrical charge thereof can be separated. Therefore, if the exposure operation of all the pixels is controlled at the same time and the timing is shifted in row units during the operation to read accumulated charge, the received light signals of all the pixels can be read accurately in the same way as the prior art.

The exposure operation of the CMOS area image sensor of the second embodiment will be described next.

Figure 18:
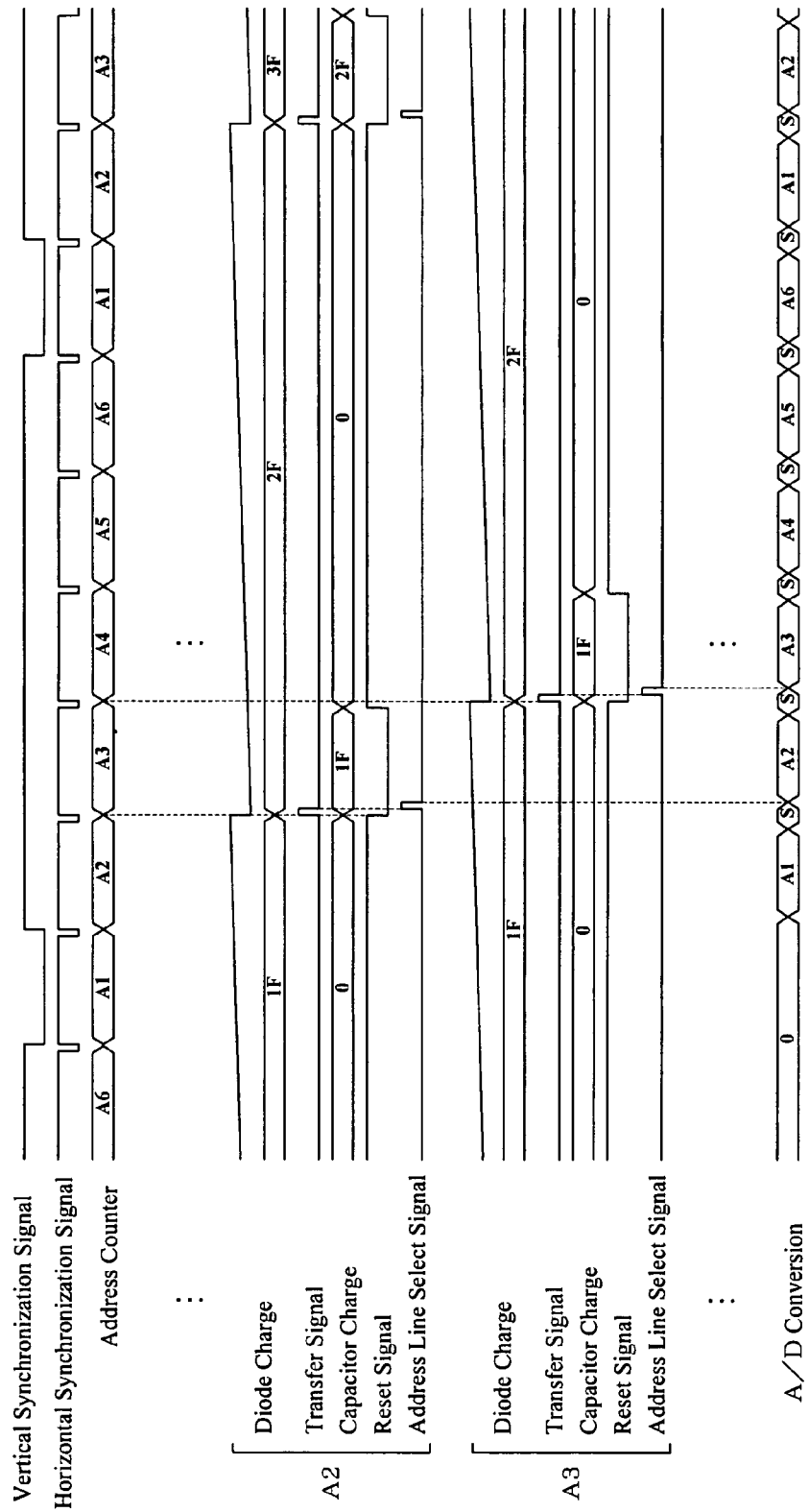
FIG. 18 is a time chart showing the exposure operation in a normal input mode that is the same as that of the prior art.
Figure 19:
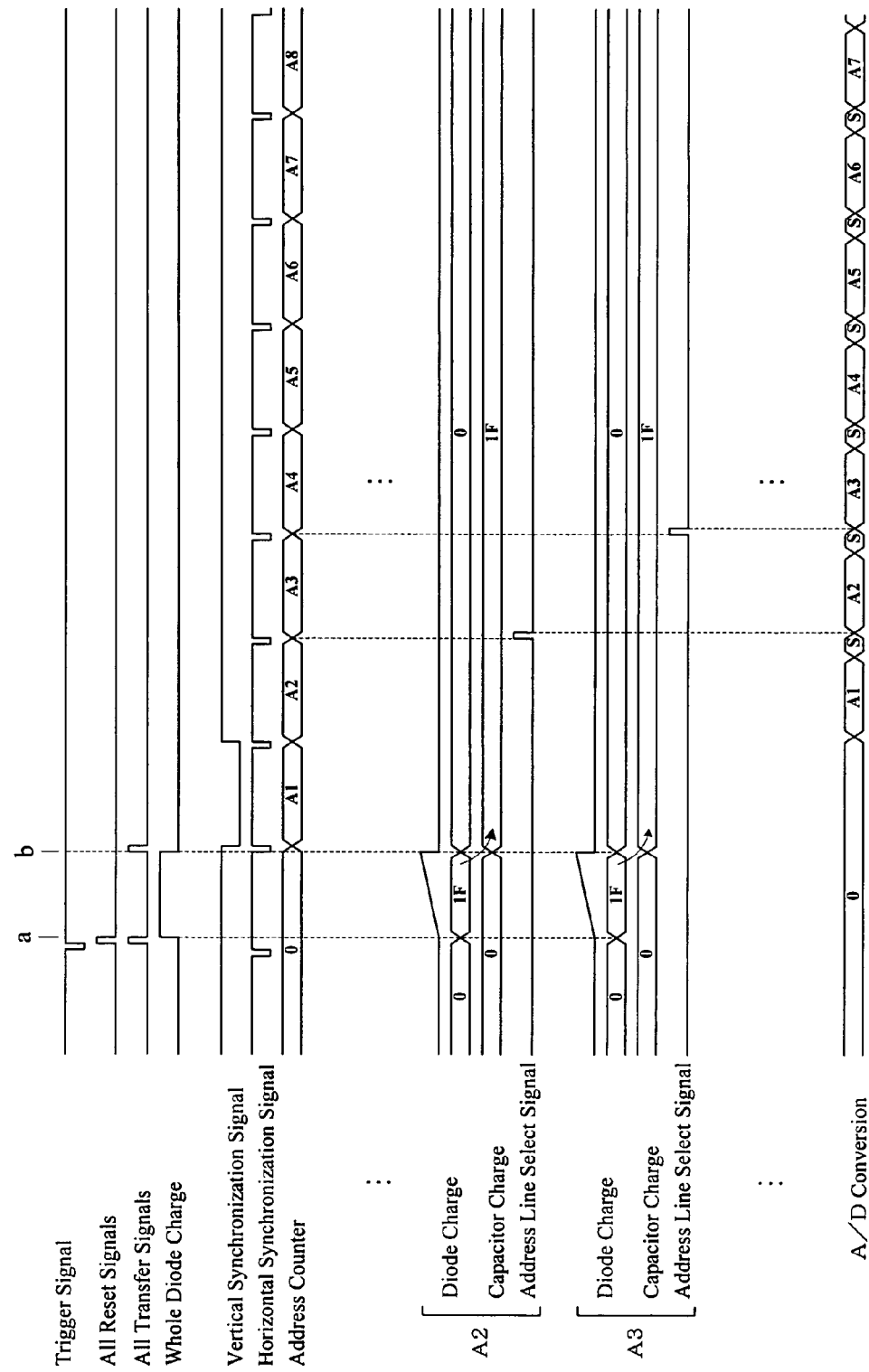
FIG. 19 is a time chart showing the exposure operation in a global shutter input mode with a relatively short exposure time and the same exposure timing for all the pixels.
Figure 20:
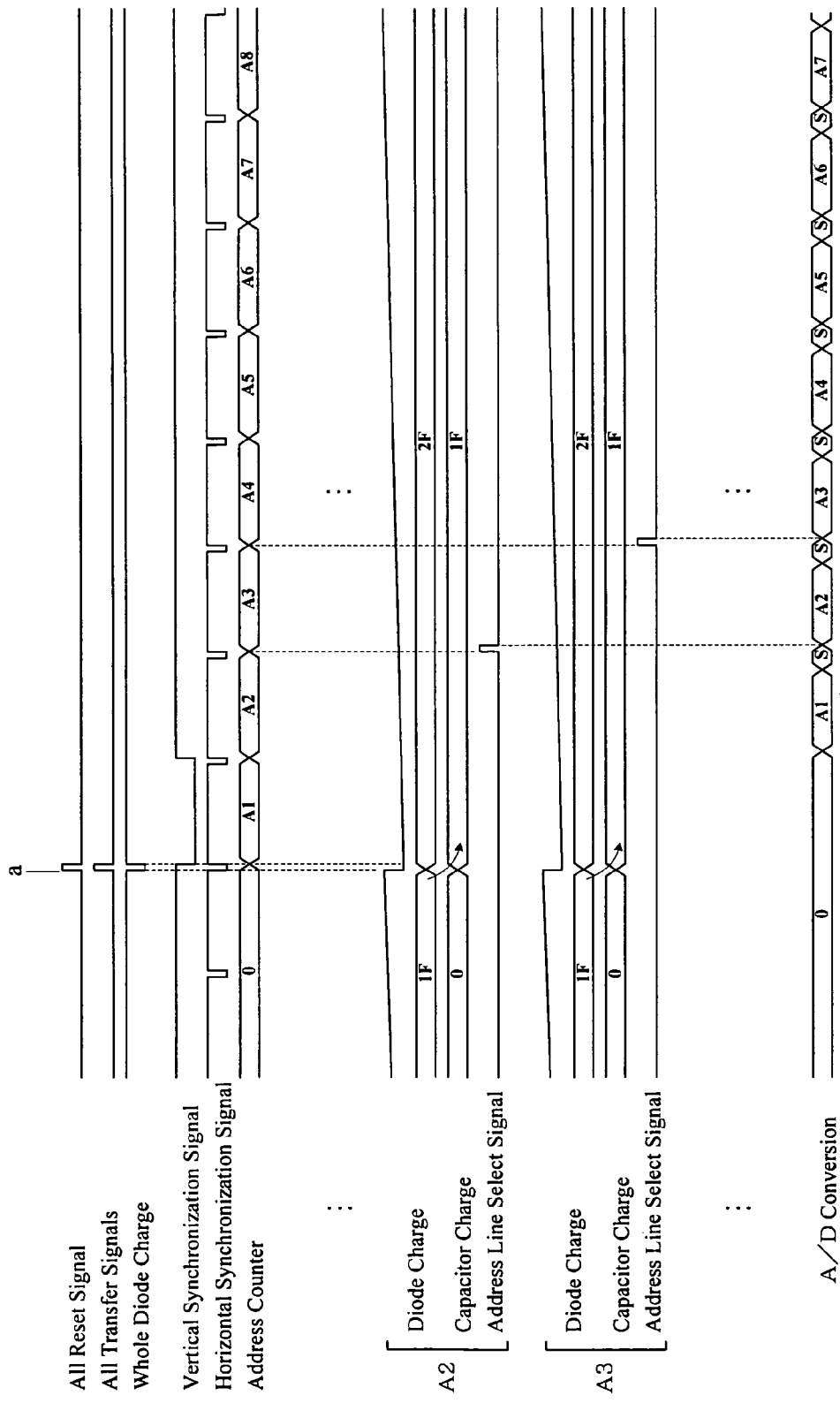
FIG. 20 is a time chart showing the exposure operation in a global shutter input mode with a relatively long exposure time and the same exposure timing for all the pixels.

FIGS. 18 to 20 are time charts showing operation timing when a moving image is inputted. More particularly, FIG. 18 is a normal input mode in which the exposure timing is shifted one row at a time in the same way as the prior art; FIG. 19 shows a global shutter input mode with a relatively short exposure time with the same exposure timing for all the pixels; and FIG. 20 shows a global shutter input mode with a relatively long exposure time with the same exposure timing for all the pixels. Each figure shows the operation timing for the second and third rows corresponding to two address lines A2 and A3. Such operation timing is also applied in the same manner in other rows. Further, the normal input mode in FIG. 18 is merely a comparative example and, in reality, such an operation mode is not adopted.

In the normal input mode, as shown in FIG. 18, when the time from when a vertical synchronization signal is inputted until the next vertical synchronization signal is inputted is one cycle, the control portion 9 writes an address value indicating the select scanning order of the respective address lines A1 to A6 to an address counter in sync with the horizontal synchronization signal during this one cycle. One cycle of the vertical synchronization signal corresponds to one frame of image data. Further, one cycle of the horizontal synchronization signal corresponds to one row's worth of signal processing time.

For example, the control portion 9 reads the address value 'A2' from the address counter and, until the address value 'A2' is read again, the photodiode 10 of the second row is in the exposure state (charging). Further, the address value 'A3' is read from the address counter and, until the address value 'A3' is read again, the photodiode 10 of the third row is in the exposure state. The pixel signals of the second and third rows resulting from this exposure form part of the first frame (1F).

Further, the control portion 9 outputs a transfer signal to the transfer control line T of the second row at the time the address value 'A2' is read. Further, the control portion 9 outputs a transfer signal to the transfer control line T of the third row at the time the address value 'A3' is read. As a result, in the second row, the pixel signal of the photodiode 10 is transferred to the capacitor C via the transfer transistor TRt and, so too in the third row, the pixel signal of the photodiode 10 is similarly transferred to the capacitor C delayed by one cycle of the horizontal synchronization signal.

Thereupon, in each row, the reset signal on the reset line R is at the low level in accordance with the transmission timing of the transfer signal (the timing with which the transfer transistor TRt is turned ON). Further, a high-level select signal is outputted to the respective address lines A2 and A3 immediately after the reset signal goes low in each row. As a result, a pixel signal is accumulated in the capacitor C in each row (charge) and, immediately thereafter, the pixel signal is inputted to the amplification transistor TRa with the transmission timing of the select signal (timing at which the select transistor TRs is turned ON) and is amplified and the amplified pixel signal is outputted to the A/D converter 6 via the select transistor TRs and signal line L.

Further, a pixel signal is converted into digital image data within the time of one cycle of the horizontal synchronization signal by the A/D converter 6. In addition, the image data is outputted to the frame memory as one row's worth of serial data by the shift register 7 within the same cycle time. By repeating this series of operations in row units and in frame units, a plurality of frames' worth of consecutive image data, that is, a moving image is obtained.

Further, in the normal input mode, as is clear from FIG. 18, because the exposure of a plurality of pixels arranged in each row is sequentially started in sync with the horizontal synchronization signal, the exposure start timing is different each time. As a result, the exposure time is the same. However, because the frame image is constituted by pixel signals with different exposure times in each row, when the photographic subject moves, distortion is produced in the frame image. As a result, the global shutter input mode described below is actually adopted.

First, a global shutter input mode of a short exposure system will be described.

As shown in FIG. 19, in the case of the global shutter input mode of a short exposure system, the control portion 9 instantly sends all the high-level reset signals on the reset lines R, . . . at the same time of all rows in accordance with the input of the trigger signal. At the same time, the control portion 9 sends all the transfer signals consisting of pulse signals that rise to the high level instantly on the transfer control lines T, . . . of all the rows (see timing a). Thereupon, the electrical charge that has accumulated in the photodiodes 10 and capacitors C in all the pixels is discharged to the outside via the reset transistors TRr, . . . , whereupon the photodiode 10 and capacitor C are reset, and exposure is started.

Thereafter, the control portion 9 instantly sends all the high-level transfer signals immediately before the vertical synchronization signal is inputted (see timing b). As a result, the transfer transistor TRt is OFF for a short time (the time from timing a to timing b) and the photodiodes 10 of all the pixels are in the exposure state at the same time over this interval. Further, in all the pixels, the electrical charge that has accumulated in accordance with the received light amount in the capacitors C, . . . is transferred via the transfer transistor TRt from the photodiodes 10, . . . at the point where all the transfer signals are resent (timing b) (see the capacitor charge of A2 and A3 in FIG. 18), and the charge that has accumulated in these capacitors C is in a temporarily accumulated state.

Thereafter, the control portion 9 sends a select signal to the address line A for each single row in sync with the horizontal synchronization signal (see the horizontal synchronization signal in FIG. 19 and the address select signal of A2 and A3). Thereupon, in the plurality of pixels that are arranged in each row, the pixel signals are amplified by the amplification transistor TRa on the basis of the electrical charge resulting from the simultaneous exposure of all the pixels that has accumulated in the capacitor C and then outputted to the signal line L via the select transistor TRs. Thereafter, the pixel signals of each row are converted to digital signals by the A/D converter 6 (see A/D conversion in FIG. 19) and then transferred to the frame memory via the shift register 7. Further, image data corresponding to one frame is stored in the frame memory by performing this operation for all the rows. In addition, image data for a moving image is obtained by repeating the generation of the image data for each single frame.

In short, in global shutter input mode of a short exposure system, as can be seen from FIG. 19, an exposure operation is performed at the same time for all the pixels in a relatively short exposure time and, immediately afterward, the electrical charge that has accumulated in the photodiode 10 is transferred at once to the capacitor C to afford the photodiode 10 an exposure-capable state, whereas the accumulated electrical charge that is temporarily saved in the capacitor C is sequentially read in row units in sync with the horizontal synchronization signal, converted to image data of a digital signal by the A/D converter 6, and then stored to the frame memory via the shift register 7. Therefore, a pickup image without image distortion can be obtained even when the photographic subject is a moving object.

The global shutter input mode of a long exposure system will be described next.

As shown in FIG. 20, in the global shutter input mode of a long exposure system, the control portion 9 instantly sends all the reset signals and all the transfer signals of a high level to all of the reset lines R, . . . and transfer control lines T, . . . respectively at the same time immediately before the vertical synchronization signal is inputted (see timing a). Thereupon, the electrical charge that has accumulated in the photodiodes 10, . . . and capacitors C, . . . in all the pixels is discharged to the outside via the reset transistors TRr, . . . , the photodiodes 10, . . . and capacitors C, . . . are reset, and exposure is started.

Thereafter, the control portion 9 does not send all the reset signals and all the transfer signals until immediately before the next vertical synchronization signal is inputted (not shown in FIG. 20). As a result, the transfer transistor TRt is OFF for a long time that corresponds to the cycle of the vertical synchronization signal (corresponds to the capture time of one frame's worth of image data) and the photodiodes 10, . . . of all the pixels are afforded an exposure state at the same time over this interval.

Further, the control portion 9 sends a select signal to the address line A for each single row in sync with the horizontal synchronization signal while an exposure operation is performed for all the pixels (see the address select signal of A2 and A3 and the horizontal synchronization signal in FIG. 20). In the plurality of pixels arranged in each row, the pixel signals are amplified by the amplification transistor TRa on the basis of the electrical charge resulting from the previous simultaneous exposure of all the pixels that has accumulated in the capacitor C and outputted to the signal line L via the select transistor TRs. Thereafter, the pixel signals of each row are converted to digital signals by the A/D converter 6 (see A/D conversion in FIG. 20) and then transferred to the frame memory via the shift register 7. Further, one frame's worth of image data is stored in the frame memory by performing this operation for all the rows.

That is, in the global shutter input mode of a long exposure system, while exposure of a time corresponding to the cycle of the vertical synchronization signal is performed at the same time for all the pixels, the electrical charge corresponding with the received light amount obtained in the previous simultaneous exposure of all the pixels is sequentially read to the A/D converter 6 in row units from the capacitor C of each pixel and converted to digital image data before being stored in the frame memory via the shift register 7. Therefore, in the global shutter input mode of a long exposure system, there is no image distortion even when the photographic subject is a moving object and an adequate pickup image can be obtained also from the perspective of clarity.

In the case of a conventional CMOS area image sensor, the exposure operation for each pixel is controlled by shifting the exposure start timing in row units. Therefore, in order to reduce the temporal shift of each row as much as possible in order to suppress image distortion, the speed of the A/D conversion and so forth can also be further increased by raising the frequency (clock frequency) of the horizontal synchronization signal. However, in so doing, although there is the inconvenience that the electrical power consumption of the A/D converter 6 and so forth increases, with the CMOS area image sensor according to the second embodiment, the exposure operation of all the pixels can be performed at the same time. Therefore, there is no need to increase the clock frequency and the inconvenience of increased electrical power consumption is not produced.

A modified example of the CMOS area image sensor according to the second embodiment will be described next. Further, a description of the same points as those of the second embodiment is omitted here by assigning the same reference numerals.

Figure 21:
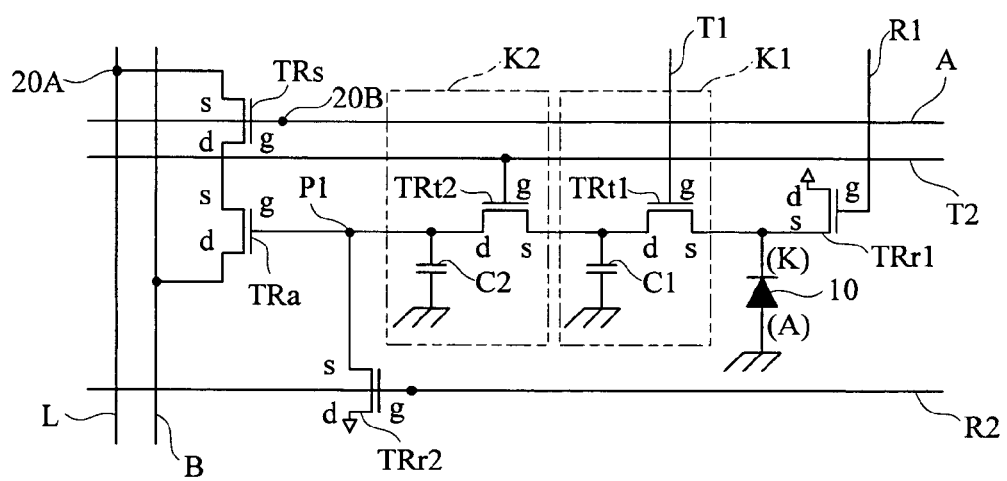
FIG. 21 is a circuit diagram showing a constitution corresponding to one pixel of a modified example of a CMOS area image sensor of the second embodiment.

FIG. 21 is a circuit diagram showing a constitution corresponding to one pixel of a modified example of a CMOS area image sensor of the second embodiment.

In the modified example, two sets of a set that connects the output terminal (drain) of the transfer transistor TRt and the main electrode of the capacitor C are provided between photodiode 10 and the connection point P1 are provided. That is, the capacitor for temporarily holding the accumulated electrical charge of the photodiode 10 is constituted in two stages.

As shown by the blocks K1 and K2 circled by virtual lines in FIG. 21, when the block K1 close to the photodiode 10 is the first set and the farthest block K2 is the second set, the source of the transfer transistor TRt1 of the first set is connected to the cathode of the photodiode 10 and the drain is connected to the source of the transfer transistor TRt2 and to the main electrode of the capacitor C1 of the second set, while the gate is connected to the first transfer control line T1. Further, the drain of the transfer transistor TRt2 of the second set is connected to the connection point P1 and the gate of the transfer transistor TRt2 is connected to the second transfer control line T2.

Further, a reset transistor for the photodiode 10 is provided separately from the reset transistor for the capacitor of the second set. Supposing that the latter is the first reset transistor TRt1 and the former is the second reset transistor TRt2, the source of the first reset transistor TRt1 is connected to the output terminal (cathode) of the photodiode 10 and the gate is connected to the first reset line R1. Further, the source of the second reset transistor TRt2 is connected to the connection point P1 and the gate is connected to the second reset line R2.

The exposure operation of the modified example of the CMOS area image sensor will be described next.

Figure 22:
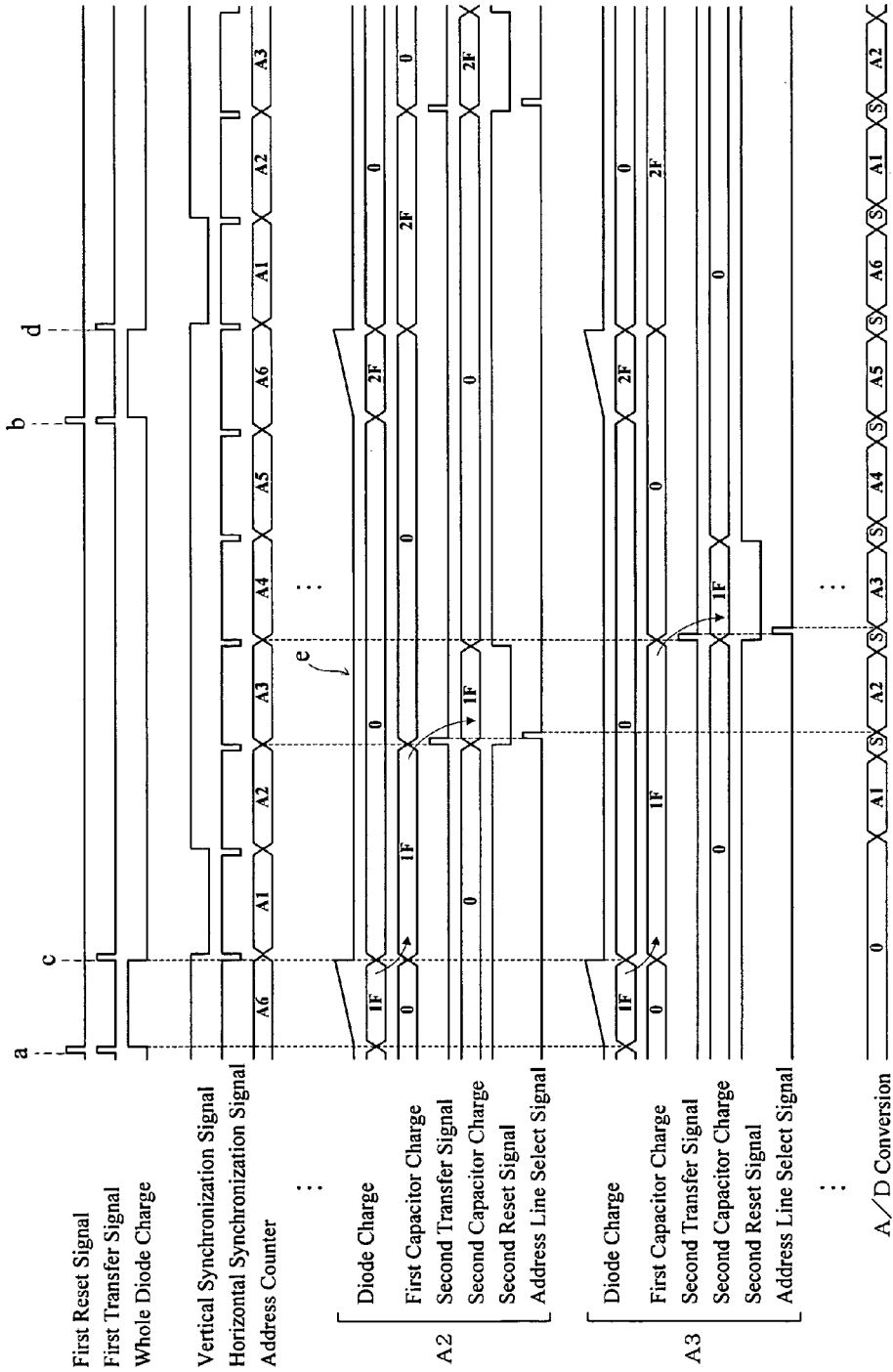
FIG. 22 is a time chart showing the exposure operation in the global shutter input mode of the CMOS area image sensor of the modified example.
Figure 23:
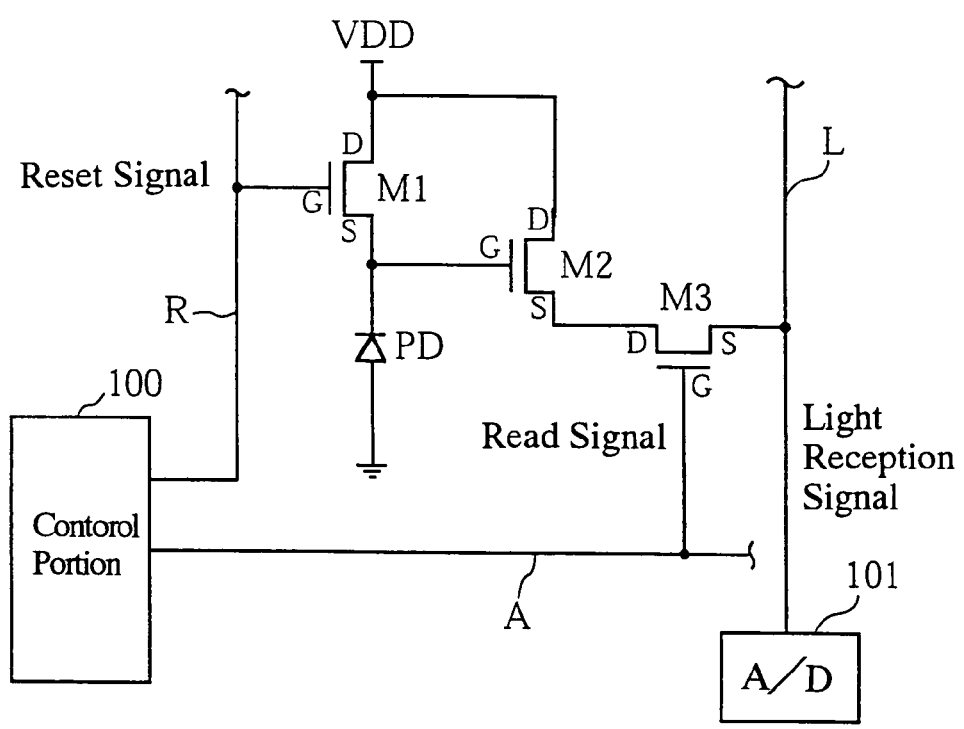
FIG. 23 shows the constitution of one pixel of a conventional CMOS area image sensor.
Figure 24:
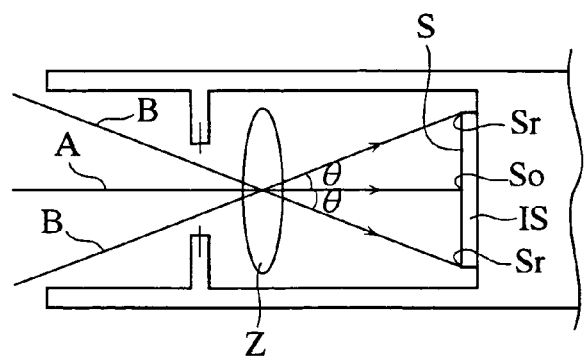
FIG. 24 is a schematic diagram showing an imaging optical system of a digital camera.
Figure 25:
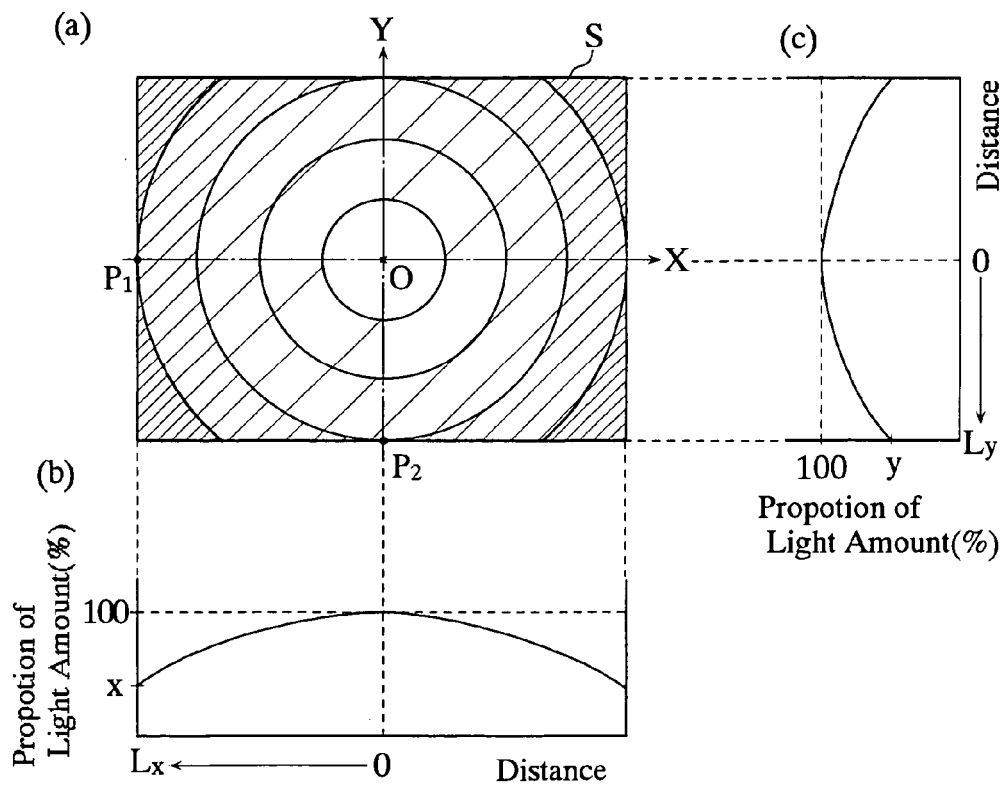
FIG. 25 shows the distribution of light amounts of the image read area.
Figure 26:
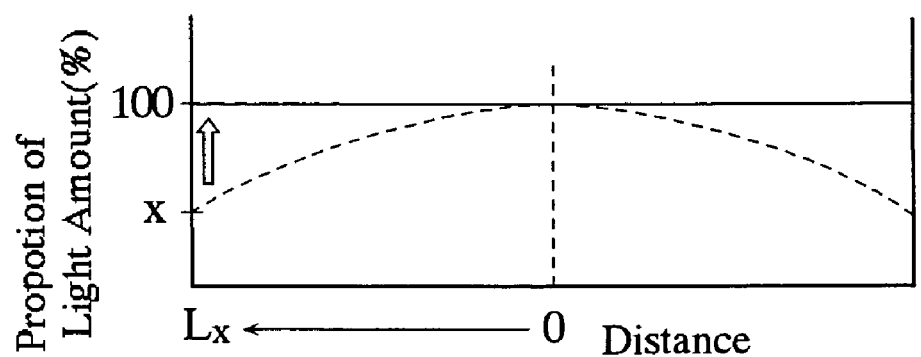
FIG. 26 shows the relationship between the distance from the center in a Y-axis cross-section and the proportion of the light amount.
Figure 27:
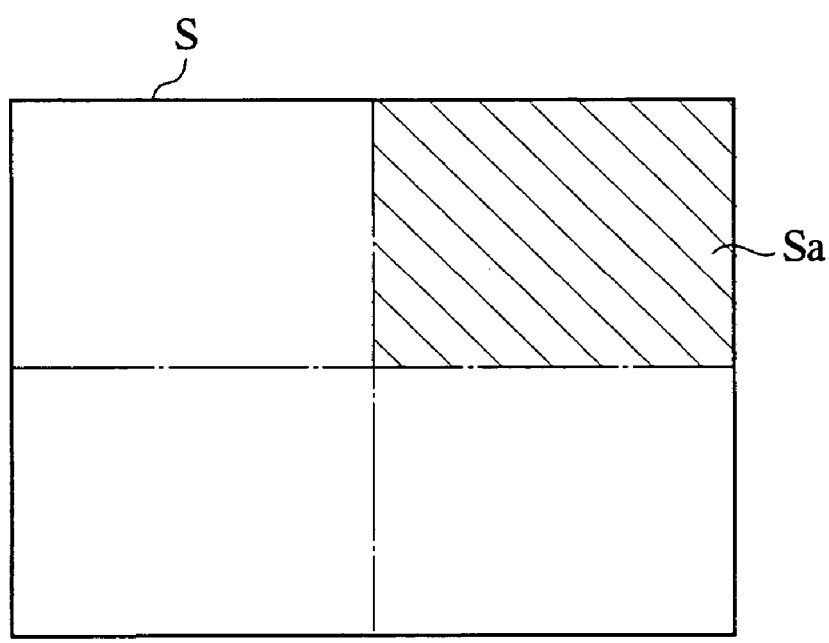
FIG. 27 shows an area (one quadrant) of substantially ¼ of the image read area.

FIG. 22 is a time chart showing the operation timing during the input of a moving image of a modified example. The time chart is a time chart of the global shutter input mode. Further, the operation timing for the second and third rows that correspond to the two address lines A2 and A3 is shown. Such operation timing is applied similarly in the other rows.

In the global shutter input mode of the modified example, the control portion 9 instantly sends a first reset signal of a high level on the first reset line R1 at the same time for all the rows with the same timing as the timing shown in FIG. 19. At the same time, the control portion 9 instantly sends a first transfer signal of a high level on the first transfer control line T1 for all the rows. Thereupon, exposure is started at the same time for the photodiodes 10, . . . of all the pixels (see timing a and b).

Thereafter, the control portion 9 instantly sends the first transfer signal of a high level immediately before inputting the vertical synchronization signal (see timing c and d). As a result, the transfer transistor TRt1 of a first set is turned OFF for a short time and the photodiodes 10, . . . of all the pixels are afforded an exposure state at the same time over this interval. Further, for all the pixels, the pixel signals are transferred from the photodiodes 10, . . . to the capacitors C1, . . . of the same set via the transfer transistor TRt1 of the first set at the point (see timing c, d) the first transfer signal is resent, and a state where the pixel signals are temporarily stored in the capacitors C1, . . . is established.

Thereafter, the control portion 9 outputs a second transfer signal to the second transfer control line T2 of the second row at the point where the address value 'A2' is read from the address counter, for example. Further, the control portion 9 sends the second transfer signal to the second transfer control line T2 of the third row at the point where the address value 'A3' is read from the address counter. As a result, in the second row, the electrical charge (pixel signal) that has accumulated in the capacitor C1 of the first set is transferred to the capacitor C2 of the second set via the transfer transistor TRt2 of the second set and, so too for the third row with a delay of one cycle of the horizontal synchronization signal, electrical charge (pixel signal) that has accumulated in the capacitor C1 of the first set is similarly transferred to the capacitor C2 of the second set.

Here, in each row, the second reset signal on the second reset line R2 is afforded a low level in accordance with the timing for sending the second transfer signal (timing at which the transfer transistor TRt2 of the second set is turned ON). Further, immediately after the second reset signal is afforded a low level in each row, a high-level select signal is outputted to the respective address lines A2 and A3. As a result, in each row, electrical charge is accumulated (charge) in the capacitor C2 of the second set and, immediately afterward, the pixel signal is amplified as a result of being inputted to the amplification transistor TRa with the timing for sending the select signal (timing at which the switching transistor TRs is turned ON) and the amplified pixel signal is outputted to the A/D converter 6 via the select transistor TRs and signal line L.

Further, the pixel signal is converted to digital image data in the time of one cycle of the horizontal synchronization signal by the A/D converter 6. In addition, the image data is outputted to the frame memory as one row's worth of serial data by the shift register 7 in the same single-cycle time. By repeating this series of operations in row units and in frame units, a plurality of frames' worth of consecutive image data, that is, a moving image, is obtained.

In short, in global shutter input mode of the modified example, as can be seen from FIG. 22, an exposure operation is performed at the same time for all the pixels and, immediately afterward, the electrical charge that has accumulated in the photodiode 10 is transferred at once to the capacitor C1 to afford the photodiode 10 an exposure-capable state, whereas the accumulated electrical charge that is temporarily saved in the capacitor C1 is sequentially read while being transferred to the capacitor C2 of the second set in row units in sync with the horizontal synchronization signal (see the read processing of the pixel signal of the second row of the period e in FIG. 22), converted to image data of a digital signal by the A/D converter 6, and then stored to the frame memory via the shift register 7. Therefore, similarly to the CMOS area image sensor according to the second embodiment, a pickup image without image distortion can be obtained even when the photographic subject is a moving object.

Further, the results of each of the above embodiments are particularly effective when a moving image is displayed on the liquid-crystal monitor of the digital camera and when moving image data is captured in a recordable memory or the like, for example.

Further, the area image sensor 1 may be any of a color image sensor or a monochrome image sensor. Further, pixel placement is not limited to a lattice shape and may be an arrangement such as a honeycomb structure, for example.

The control portion 9 may scan the address lines A, alternately, for example. In such a case, the data amount can be reduced by increasing the frame rate.

A variety of modifications is possible relative to other points within the scope of the present invention. For example, the number of capacitors C and the number of transfer transistors TRt per pixel may each be three or more.

Moreover, the present invention is not limited to the embodiments above. The area image sensor 1 is not limited to a digital camera and can also be applied to a digital video camera and a portable-type phone with a photographic function or the like, for example, and can be applied widely to industrial scanning devices and so forth.

The invention claimed is:

1. An area image sensor comprising a plurality of pixels arranged in a lattice shape on an imaging face for photoelectrically converting light of a subject optical image that is focused on the imaging face via an imaging optical system into an electrical signal in each pixel and outputting the electrical signal, each pixel comprising:

a photoelectric conversion element that converts light rendered through exposure by accumulating electrical charge in accordance with a received light amount into an electrical signal;

a select transistor for outputting to the outside accumulated electrical charge from the photoelectric conversion element following the end of exposure;

one or two or more electrical charge holding circuits provided between the photoelectric conversion element and the select transistor that comprise a capacitor for temporarily holding electrical charge that has accumulated as a result of exposure from the photoelectric conversion element and a transfer transistor for controlling the transfer of the accumulated electrical charge of the photoelectric conversion element to the capacitor; and a reset transistor provided between the select transistor and the electrical charge holding circuit for discharging residual electrical charge of the capacitor prior to the start of exposure, wherein, while determining a horizontal correction coefficient for correcting the level of a photoelectric conversion signal that is outputted from the pixels corresponding with each point located on a horizontal coordinate axis that passes through a predetermined point of the image read area in the imaging face and a vertical correction coefficient for correcting the level of a photoelectric conversion signal that is outputted from the pixels corresponding with each point located on a vertical coordinate axis that passes through a predetermined point of the image read area in the imaging face, the level of the photoelectric conversion signal of each pixel is corrected by multiplying the photoelectric conversion signal that is outputted by each pixel in the image read area by the horizontal correction coefficient corresponding with the horizontal coordinate of each pixel and by the vertical correction coefficient that corresponds with the vertical coordinate.

2. An area image sensor comprising a plurality of pixels arranged in a lattice shape on an imaging face for photoelectrically converting light of a subject optical image that is focused on the imaging face via an imaging optical system into an electrical signal in each pixel and outputting the electrical signal, each pixel comprising:

a photoelectric conversion element that converts light rendered through exposure by accumulating electrical charge in accordance with a received light amount into an electrical signal;

a select transistor for outputting to the outside accumulated electrical charge from the photoelectric conversion element following the end of exposure;

one or two or more electrical charge holding circuits provided between the photoelectric conversion element and the select transistor that comprise a capacitor for temporarily holding electrical charge that has accumulated as a result of exposure from the photoelectric conversion element and a transfer transistor for controlling the transfer of the accumulated electrical charge of the photoelectric conversion element to the capacitor; and a reset transistor provided between the select transistor and the electrical charge holding circuit for discharging residual electrical charge of the capacitor prior to the start of exposure;

wherein a plurality of signal lines for outputting photoelectric conversion signals from a plurality of pixels arranged in each column is provided in each column;

a plurality of transfer control lines, reset lines, and address lines, which serve to control the ON/OFF of the transfer transistor, the reset transistor and the select transistor respectively of a plurality of pixels arranged in each row, are provided in each row; and the simultaneous exposure of all the pixels is started by simultaneously outputting reset signals and transfer signals to all of the reset lines and all of the transfer control lines respectively and the simultaneous exposure of all the pixels is subsequently terminated by outputting the transfer signals once again to all of the transfer control lines when a predetermined exposure time has elapsed, whereupon photoelectric conversion signals resulting from the simultaneous exposure of all the pixels are simultaneously outputted to each row from the plurality of pixels arranged in each row by sequentially outputting select signals to the address lines of each row in sync with a plurality of horizontal synchronization signal outputted in sync with a vertical synchronization signal.

3. The area image sensor according to claim 1 wherein the electrical charge accumulation circuit has a constitution in which one electrode of the capacitor is connected to the output terminal of the transfer transistor and the other electrode is grounded; and the input terminal of the transfer transistor is connected to the photoelectric conversion element side and one electrode of the capacitor is connected to the reset transistor side.

4. The area image sensor according to claim 1, wherein, in each pixel, two of the electrical charge holding circuits are connected in series between the photoelectric conversion element and the select transistor, and a second reset transistor for discharging residual electrical charge of the photoelectric conversion element prior to the start of exposure is connected to the input terminal of the photoelectric conversion element.

5. The area image sensor according to claim 1, wherein a plurality of signal lines for outputting photoelectric conversion signals from a plurality of pixels arranged in each column is provided in each column;

a plurality of transfer control lines, reset lines, and address lines, which serve to control the ON/OFF of the transfer transistor, the reset transistor and the select transistor respectively of a plurality of pixels arranged in each row, are provided in each row; and the simultaneous exposure of all the pixels is started by simultaneously outputting reset signals and transfer signals to all of the reset lines and all of the transfer control lines respectively and the simultaneous exposure of all the pixels is subsequently terminated by outputting the transfer signals once again to all of the transfer control lines when a predetermined exposure time has elapsed, whereupon photoelectric conversion signals resulting from the simultaneous exposure of all the pixels are simultaneously outputted to each row from the plurality of pixels arranged in each row by sequentially outputting select signals to the address lines of each row in sync with a plurality of horizontal synchronization signals outputted in sync with a vertical synchronization signal.

6. The area image sensor according to claim 1, wherein a plurality of signal lines for outputting photoelectric conversion signals from a plurality of pixels arranged in each column is provided in each column;

a plurality of transfer control lines, reset lines, and address lines, which serve to control the ON/OFF of the transfer transistor, the reset transistor and the select transistor respectively of a plurality of pixels arranged in each row, are provided in each row; and simultaneous exposure of all the pixels of a time that corresponds to the cycle of a vertical synchronization signal is repeated by simultaneously outputting a reset signal and transfer signal to all of the reset lines and all of the transfer control lines respectively in sync with the vertical synchronization signal, and photoelectric conversion signals resulting from the simultaneous exposure of all the pixels of one exposure period earlier are simultaneously outputted to each row from the plurality of pixels arranged in each row by sequentially outputting select signals to the address lines of each row in sync with a plurality of horizontal synchronization signals outputted in sync with a vertical synchronization signal during each exposure period.

7. An area image sensor comprising a plurality of pixels arranged in a lattice shape on an imaging face for photoelectrically converting light of a subject optical image that is focused on the imaging face via an imaging optical system into an electrical signal in each pixel and outputting the electrical signal, wherein, while determining a horizontal correction coefficient for correcting the level of a photoelectric conversion signal that is outputted from the pixels corresponding with each point located on a horizontal coordinate axis that passes through a predetermined point of the image read area in the imaging face and a vertical correction coefficient for correcting the level of a photoelectric conversion signal that is outputted from the pixels corresponding with each point located on a vertical coordinate axis that passes through a predetermined point of the image read area in the imaging face, the level of the photoelectric conversion signal of each pixel is corrected by multiplying the photoelectric conversion signal that is outputted by each pixel in the image read area by the horizontal correction coefficient corresponding with the horizontal coordinate of each pixel and by the vertical correction coefficient that corresponds with the vertical coordinate.

8. The area image sensor according to claim 1, wherein a predetermined point of the image read area is the point where the pixel for which a reference received light amount from the imaging optical system is maximum is located.

9. The area image sensor according to claim 1, wherein the horizontal correction coefficient is determined on the basis of the reciprocal number of the ratio of a reference received light amount of each pixel arranged on the horizontal coordinate axis that passes through the predetermined point with respect to the reference received light amount of the pixel located at the predetermined point; and the vertical correction coefficient is determined on the basis of the reciprocal number; of the ratio of the reference received light amount of each pixel arranged on the vertical coordinate axis that passes through the predetermined point with respect to the reference received light amount of the pixel located at the predetermined point.

10. The area image sensor according to claim 1, comprising:
a plurality of A/D conversion means provided in each column that perform conversion to a digital signal by comparing the level of an analog photoelectric conversion signal that is outputted by a plurality of pixels arranged in each column with a predetermined reference level;
first reference level setting means that set, for the A/D conversion means, a different reference level for each row in accordance with a value that is associated with the vertical correction coefficient when a photoelectric conversion signal is outputted by a plurality of pixels arranged in each row in row units; and
second reference level setting means that set, for each of the A/D conversion means, a different reference level in accordance with a value that is associated with the horizontal correction coefficient.

11. The area image sensor according to claim 10, wherein the horizontal setting means set a different reference level for each of the A/D conversion means by dividing the reference voltage by means of resistors.

12. The area image sensor according to claim 1, comprising:
a plurality of A/D conversion means provided in each column that perform conversion to a digital signal by comparing the level of an analog photoelectric conversion signal that is outputted by a plurality of pixels arranged in each column with a predetermined reference level;
first reference level setting means that set, for the A/D conversion means, a different reference level for each row in accordance with a value that is associated with the vertical correction coefficient when an analog signal is outputted by a plurality of pixels arranged in each row in row units; and
second reference level setting means that count the output of each of the A/D conversion means with a predetermined count range serving as a reference and set a different count range for each of the A/D conversion means in accordance with a value that is associated with the horizontal correction coefficient.

13. The area image sensor according to claim 1, comprising:
horizontal correction coefficient storage means that pre-store a horizontal correction coefficient corresponding with each point located on a horizontal coordinate axis that passes through a predetermined point of the image read area;
vertical correction coefficient storage means that pre-store a vertical correction coefficient corresponding with each point located on a vertical coordinate axis that passes through a predetermined point of the image read area; and
multiplication means that multiply a photoelectric conversion signal that is outputted by each pixel in the image read area by a horizontal correction coefficient corresponding with a horizontal coordinate of the pixel that is stored in the horizontal correction coefficient storage means and by a vertical correction coefficient corresponding with a vertical coordinate of the pixel that is stored in the vertical correction coefficient storage means.

14. The area image sensor according to claim 13, wherein the horizontal correction coefficient storage means store the horizontal correction coefficient by thinning the horizontal correction coefficient; and
the vertical correction coefficient storage means store the vertical correction coefficient by thinning the vertical correction coefficient.

15. The area image sensor according to claim 2, wherein the electrical charge accumulation circuit has a constitution in which one electrode of the capacitor is connected to the output terminal of the transfer transistor and the other electrode is grounded; and
the input terminal of the transfer transistor is connected to the photoelectric conversion element side and one electrode of the capacitor is connected to the reset transistor side.

16. The area image sensor according to claim 2, wherein, in each pixel, two of the electrical charge holding circuits are connected in series between the photoelectric conversion element and the select transistor, and a second reset transistor for discharging residual electrical charge of the photoelectric conversion element prior to the start of exposure is connected to the input terminal of the photoelectric conversion element.

17. An area image sensor comprising a plurality of pixels arranged in a lattice shape on an imagine face for photoelectrically converting light of a subject optical image that is focused on the imaging face via an imaging optical system into an electrical signal in each pixel and outputting the electrical signal,
each pixel comprising:
a photoelectric conversion element that converts light rendered through exposure by accumulating electrical charge in accordance with a received light amount into an electrical signal;
a select transistor for outputting to the outside accumulated electrical charge from the photoelectric conversion element following the end of exposure;
one or two or more electrical charge holding circuits provided between the photoelectric conversion element and the select transistor that comprise a capacitor for temporarily holding electrical charge that has accumulated as a result of exposure from the photoelectric conversion element and a transfer transistor for controlling the transfer of the accumulated electrical charge of the photoelectric conversion element to the capacitor; and
a reset transistor provided between the select transistor and the electrical charge holding circuit for discharging residual electrical charge of the capacitor prior to the start of exposure;
wherein a plurality of signal lines for outputting photoelectric conversion signals from a plurality of pixels arranged in each column is provided in each column;
a plurality of transfer control lines, reset lines, and address lines, which serve to control the ON/OFF of the transfer transistor, the reset transistor and the select transistor respectively of a plurality of pixels arranged in each row, are provided in each row; and
simultaneous exposure of all the pixels of a time that corresponds to the cycle of a vertical synchronization signal is repeated by simultaneously outputting a reset signal and transfer signal to all of the reset lines and all of the transfer control lines respectively in sync with the vertical synchronization signal, and photoelectric conversion signals resulting from the simultaneous exposure of all the pixels of one exposure period earlier are simultaneously outputted to each row from the plurality of pixels arranged in each row by sequentially outputting select signals to the address lines of each row in sync with a plurality of horizontal synchronization signals outputted in sync with a vertical synchronization signal during each exposure period.

18. The area image sensor according to claim 7, wherein a predetermined point of the image read area is the point where the pixel for which a reference received light amount from the imaging optical system is maximum is located.

19. The area image sensor according to claim 7, wherein the horizontal correction coefficient is determined on the basis of the reciprocal number of the ratio of a reference received light amount of each pixel arranged on the horizontal coordinate axis that passes through the predetermined point with respect to the reference received light amount of the pixel located at the predetermined point; and the vertical correction coefficient is determined on the basis of the reciprocal number of the ratio of the reference received light amount of each pixel arranged on the vertical coordinate axis that passes through the predetermined point with respect to the reference received light amount of the pixel located at the predetermined point.

20. The area image sensor according to claim 7, comprising:

a plurality of A/D conversion means provided in each column that perform conversion to a digital signal by comparing the level of an analog photoelectric conversion signal that is outputted by a plurality of pixels arranged in each column with a predetermined reference level;

first reference level setting means that set, for the A/D conversion means, a different reference level for each row in accordance with a value that is associated with the vertical correction coefficient when a photoelectric conversion signal is outputted by a plurality of pixels arranged in each row in row units; and second reference level setting means that set, for each of the A/D conversion means, a different reference level in accordance with a value that is associated with the horizontal correction coefficient.

21. The area image sensor according to claim 7, comprising:

a plurality of A/D conversion means provided in each column that perform conversion to a digital signal by comparing the level of an analog photoelectric conversion signal that is outputted by a plurality of pixels arranged in each column with a predetermined reference level;

first reference level setting means that set, for the A/D conversion means, a different reference level for each row in accordance with a value that is associated with the vertical correction coefficient when an analog signal is outputted by a plurality of pixels arranged in each row in row units; and second reference level setting means that count the output of each of the A/D conversion means with a predetermined count range serving as a reference and set a different count range for each of the A/D conversion means in accordance with a value that is associated with the horizontal correction coefficient.

22. The area image sensor according to claim 7, comprising:

horizontal correction coefficient storage means that pre-store a horizontal correction coefficient corresponding with each point located on a horizontal coordinate axis that passes through a predetermined point of the image read area;

vertical correction coefficient storage means that pre-store a vertical correction coefficient corresponding with each point located on a vertical coordinate axis that passes through a predetermined point of the image read area; and multiplication means that multiply a photoelectric conversion signal that is outputted by each pixel in the image read area by a horizontal correction coefficient corresponding with a horizontal coordinate of the pixel that is stored in the horizontal correction coefficient storage means and by a vertical correction coefficient corresponding with a vertical coordinate of the pixel that is stored in the vertical correction coefficient storage means.

* * * * *